United States Patent
Nimura et al.

(10) Patent No.: US 9,032,024 B2
(45) Date of Patent: May 12, 2015

(54) MOBILE TERMINAL DEVICE AND METHOD FOR CONTROLLING MOBILE TERMINAL DEVICE

(71) Applicant: Fujitsu Limited, Kawasaki-shi, Kanagawa (JP)

(72) Inventors: Kazuaki Nimura, Kawasaki (JP); Hidenobu Ito, Kawasaki (JP); Yosuke Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 195 days.

(21) Appl. No.: 13/875,742

(22) Filed: May 2, 2013

(65) Prior Publication Data
US 2014/0032647 A1    Jan. 30, 2014

(30) Foreign Application Priority Data
Jul. 24, 2012    (JP) ................. 2012-163446

(51) Int. Cl.
*G06F 15/16*    (2006.01)
*H04L 29/08*    (2006.01)
*H04W 4/00*    (2009.01)
*H04W 4/02*    (2009.01)
*H04W 4/20*    (2009.01)

(52) U.S. Cl.
CPC ............. *H04L 67/303* (2013.01); *H04W 4/001* (2013.01); *H04W 4/02* (2013.01); *H04W 4/20* (2013.01)

(58) Field of Classification Search
CPC ....... H04W 4/001; H04W 4/003; H04W 4/02; H04W 4/20
USPC ................... 709/200–203, 217–227; 713/168
See application file for complete search history.

(56) References Cited

U.S. PATENT DOCUMENTS

| 6,342,894 | B1 | 1/2002 | Nojiri | |
| 7,387,258 | B2 * | 6/2008 | Potonniee et al. | ............. 235/492 |
| 8,752,200 | B2 * | 6/2014 | Varshavsky et al. | ............. 726/28 |
| 2002/0122055 | A1 | 9/2002 | Parupudi et al. | |
| 2004/0030747 | A1 * | 2/2004 | Oppermann | ................. 709/203 |
| 2006/0148528 | A1 | 7/2006 | Jung et al. | |
| 2012/0159388 | A1 | 6/2012 | Chalouhi et al. | |

(Continued)

FOREIGN PATENT DOCUMENTS

| JP | 5-11969 | 1/1993 |
| JP | 2001-75750 | 3/2001 |

(Continued)

OTHER PUBLICATIONS

Press Release: "Fujitsu Develops Information Device Technology to Automatically Deliver and Run Applications Needed at Particular Time and Place", Fujitsu Laboratories Inc., Jul. 19, 2011, 7 pages.

(Continued)

*Primary Examiner* — Moustafa M Meky
(74) *Attorney, Agent, or Firm* — Staas & Halsey LLP

(57) ABSTRACT

A mobile terminal device coupled to a server via a network includes a processor configured to determine whether an attribute of an application matches a context specified by positional information regarding the mobile terminal device when receiving an execution instruction of the application from the server, inform a user of information indicating that the execution instruction is received when the attribute does not match the context, and execute the application based on a response to the information.

6 Claims, 25 Drawing Sheets

(56) References Cited

U.S. PATENT DOCUMENTS

2013/0019292 A1* 1/2013 Varshavsky et al. .............. 726/7
2014/0289835 A1* 9/2014 Varshavsky et al. .............. 726/7

FOREIGN PATENT DOCUMENTS

| JP | 2004-133584 | 4/2004 |
|---|---|---|
| JP | 2006-65650 | 3/2006 |
| JP | 2008-270972 | 11/2008 |
| JP | 2009-163764 | 7/2009 |

OTHER PUBLICATIONS

Extended European Search Report dated Feb. 5, 2014 in European Application No. 13167006.9-1856.

* cited by examiner

COMING BACK HOME

MOBILE TERMINAL DEVICE AND METHOD FOR CONTROLLING MOBILE TERMINAL DEVICE

CROSS-REFERENCE TO RELATED APPLICATION

This application is based upon and claims the benefit of priority of the prior Japanese Patent Application No. 2012-163446, filed on Jul. 24, 2012, the entire contents of which are incorporated herein by reference.

FIELD

The embodiments discussed herein are related to a mobile terminal device and a method for controlling a mobile terminal device.

BACKGROUND

In recent years, a context-desktop type mobile terminal device has been developed. The context-desktop type mobile terminal device changes the desktop in accordance with context identified by location information regarding the mobile terminal device, such as "work" (that is, office) or "home".

For example, if the context of the context-desktop type mobile terminal device is "work", the mobile terminal device displays only icons for business applications each having an attribute of "work" on the desktop. In contrast, if the context of the mobile terminal device is "home", the context-desktop type mobile terminal device displays only icons for home applications each having an attribute of "home" on the desktop.

Accordingly, even when the context-desktop type mobile terminal device is used outside an office, the context-desktop type mobile terminal device automatically changes its desktop with a change in the context. Thus, a risk of leakage of business information out of the mobile terminal device can be reduced.

In addition, a technique called "application push" has been developed. According to the "application push" technique, if a junior staff sends a service request to a manager, a server distributes an application used to process the service request to a mobile terminal device of the manager. The mobile terminal device automatically starts the application. According to the "application push" technique, since an application used to process a service request is automatically started upon receipt of the service request regardless of the context of the mobile terminal device, the manager can immediately respond to the service request received from, for example, a junior staff.

When the context-desktop type mobile terminal device is used outside an office and if a service request having an attribute of "work" (for example, a request for approval of a business activity), the desktop of the mobile terminal device is forcibly changed into a desktop for "work". Thus, for example, an application used to process a service request (for example, an approval application) is automatically started.

Accordingly, if a user who is travelling on public transportation (for example, a train or a bus) receives a service request having an attribute of "work", such as a request for approval, confidential information (for example, information regarding the approval) is suddenly displayed on the mobile terminal device. Thus, a risk of the confidential information being looked into by a third party around the user arises.

The context desktop technology is described in, for example, "Fujitsu Develops Information Device Technology to Automatically Deliver and Run Applications Needed at Particular Time and Place", Fujitsu Laboratories Ltd., Jul. 19, 2011 available at http://pr.fujitsu.com/jp/news/2011/07/19-1.html as of Jul. 8, 2012.)

SUMMARY

According to an aspect of the invention, a mobile terminal device coupled to a server via a network includes a processor configured to determine whether an attribute of an application matches a context specified by positional information regarding the mobile terminal device when receiving an execution instruction of the application from the server, inform a user of information indicating that the execution instruction is received when the attribute does not match the context, and execute the application based on a response to the information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

First Exemplary Embodiment

An information processing system according to a first exemplary embodiment is described below with reference to FIGS. 1 to 11.

Information Processing System

Figure 1:
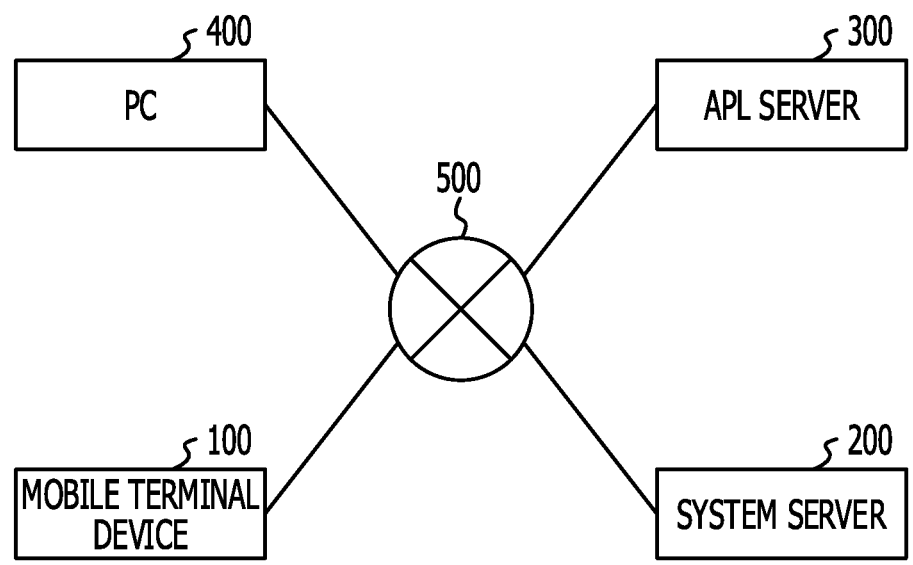
FIG. 1 is a schematic illustration of the information processing system according to a first exemplary embodiment.

FIG. 1 is a schematic illustration of the information processing system according to the first exemplary embodiment. As illustrated in FIG. 1, according to the present exemplary embodiment, the information processing system includes a mobile terminal device 100, a system server 200, an application (APL) server 300, and a personal computer (PC) 400. The mobile terminal device 100, the system server 200, the APL server 300, the PC 400 of a requester are connected to one another via a network 500. Note that according to the present exemplary embodiment, the system server 200 is separated from the APL server 300. However, the APL server 300 may be incorporated into, for example, an auxiliary storage unit 206 of the system server 200. In this manner, the APL server 300 may be integrated into the system server 200.

Mobile Terminal Device

The mobile terminal device 100 according to a first exemplary embodiment is described next. In the first exemplary embodiment, the operating system (OS) of the mobile terminal device 100 is Android™. However, the present disclosure is not limited thereto. Any OS other than Android may be employed.

Hardware of Mobile Terminal Device

Figure 2:
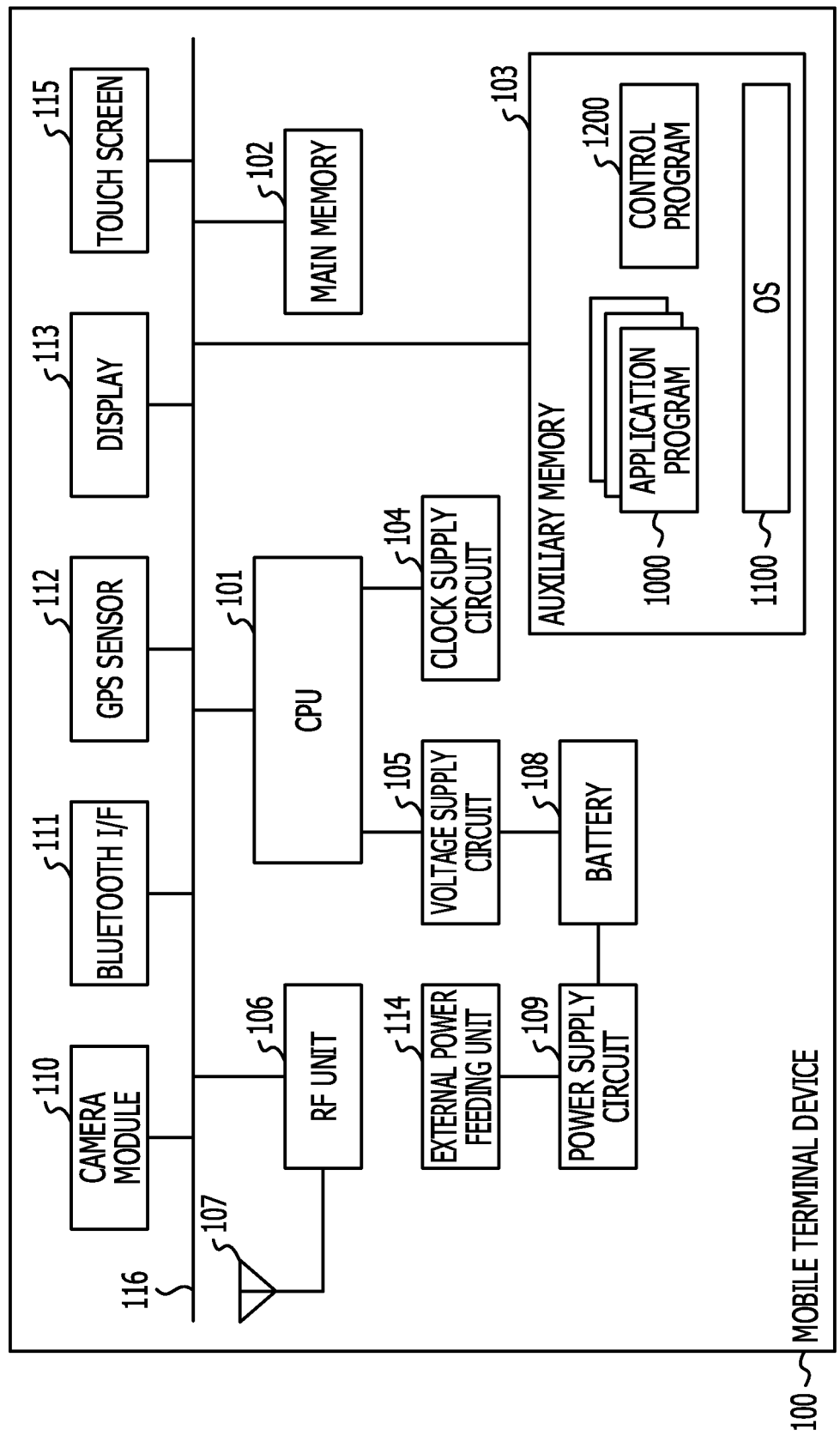
FIG. 2 is a schematic illustration of the hardware configuration of a mobile terminal device according to the first exemplary embodiment.

FIG. 2 is a schematic illustration of the hardware configuration of the mobile terminal device 100 according to the first exemplary embodiment.

According to the present exemplary embodiment, the mobile terminal device 100 is a mobile information processing apparatus, such as a smart phone or a tablet PC.

As illustrated in FIG. 2, according to the present exemplary embodiment, the mobile terminal device 100 includes the following hardware modules: a central processing unit (CPU) 101, a main memory 102, an auxiliary memory 103, a clock supply circuit 104, a voltage supply circuit 105, a radio frequency (RF) circuit 106, an antenna 107, a battery 108, a power supply circuit 109, a camera module 110, a Bluetooth interface (I/F) 111, a sensor 112, a display 113, an external power feeding unit 114, and a touch screen 115. These hardware modules are connected to one another via a bus 116.

Upon receiving a clock signal supplied from the clock supply circuit 104 and a voltage supplied from the voltage supply circuit 105, the CPU 101 operates to control the variety of hardware modules of the mobile terminal device 100. In addition, the CPU 101 loads a variety of programs stored in the auxiliary memory 103 into the main memory 102 and executes the programs loaded into the main memory 102. Thus, a variety of functions are realized. The functions are described in more detail below.

The main memory 102 stores a variety of programs executed by the CPU 101. In addition, the main memory 102 is used as a work area of the CPU 101. At that time, the main memory 102 stores various data used in processes performed by the CPU 101. For example, a random access memory (RAM) may be used as the main memory 102.

The auxiliary memory 103 stores a variety of programs that enable the mobile terminal device 100 to operate. Examples of the programs include application programs 1000 executed by the mobile terminal device 100 and an OS 1100 serving as an execution environment of the application programs 1000. The application programs 1000 include an application downloaded from the APL server 300. A control program 1200 according to the present exemplary embodiment is also stored in the auxiliary memory 103. For example, a nonvolatile memory, such as a hard disk or a flash memory, may be used as the auxiliary memory 103.

The clock supply circuit 104 generates a clock signal to be supplied to the CPU 101. The clock supply circuit 104 may be formed from, for example, a quartz oscillator that oscillates the clock signal and a real time clock (RTC).

The voltage supply circuit 105 generates a variable voltage to be supplied to the CPU 101 on the basis of electrical power supplied from the power supply circuit 109. The voltage supply circuit 105 may be formed from a voltage detector and a voltage regulator.

the RF circuit 106 is controlled by the CPU 101. The RF circuit 106 transmits a high-frequency signal from the antenna 107 to a different wireless communication apparatus. In addition, the RF circuit 106 converts a high-frequency signal received by the antenna 107 into a baseband signal. Thereafter, the RF circuit 106 outputs the baseband signal to the CPU 101.

The battery 108 supplies the electrical power to the power supply circuit 109. For example, the battery 108 may be formed from a cell, such as a lithium-ion cell, and a battery protection integrated circuit (IC).

The power supply circuit 109 supplies the electrical power supplied from the battery 108 to the hardware modules of the mobile terminal device 100 via a power line (not illustrated). Note that if an external power supply (not illustrated) is connected to the external power feeding unit 114, the power supply circuit 109 may supply electrical power supplied from the external power feeding unit 114 to the hardware modules of the mobile terminal device 100. The power supply circuit 109 may be formed from, for example, a switching regulator and a voltage regulator.

The camera module 110 is controlled by the CPU 101. The camera module 110 acquires a captured image data of a subject. The Bluetooth I/F 111 is a communication interface for establishing wireless Bluetooth™ communication with a different wireless communication apparatus. The mobile terminal device 100 further includes a wireless communication interface, such as a wireless local area network (LAN) interface.

The display 113 is controlled by the CPU 101. The display 113 displays image information for a user. The touch screen 115 is bonded to the display 113. The touch screen 115 receives information regarding a position at which the finger of the user or a pen tip is brought into contact with the touch screen 115. According to the present exemplary embodiment, the touch screen 115 is used as a position input device operated by the user.

The sensor 112 is controlled by the CPU 101. The sensor 112 acquires status information on the mobile terminal device 100. Examples of the sensor 112 include an acceleration sensor, a gyro sensor, a luminance sensor, a geomagnetic sensor, a tilt sensor, a pressure sensor, a proximity sensor, a temperature sensor, a 3G module, a wireless LAN, a global positioning system (GPS) module.

Functional Blocks of Mobile Terminal Device

Figure 3:
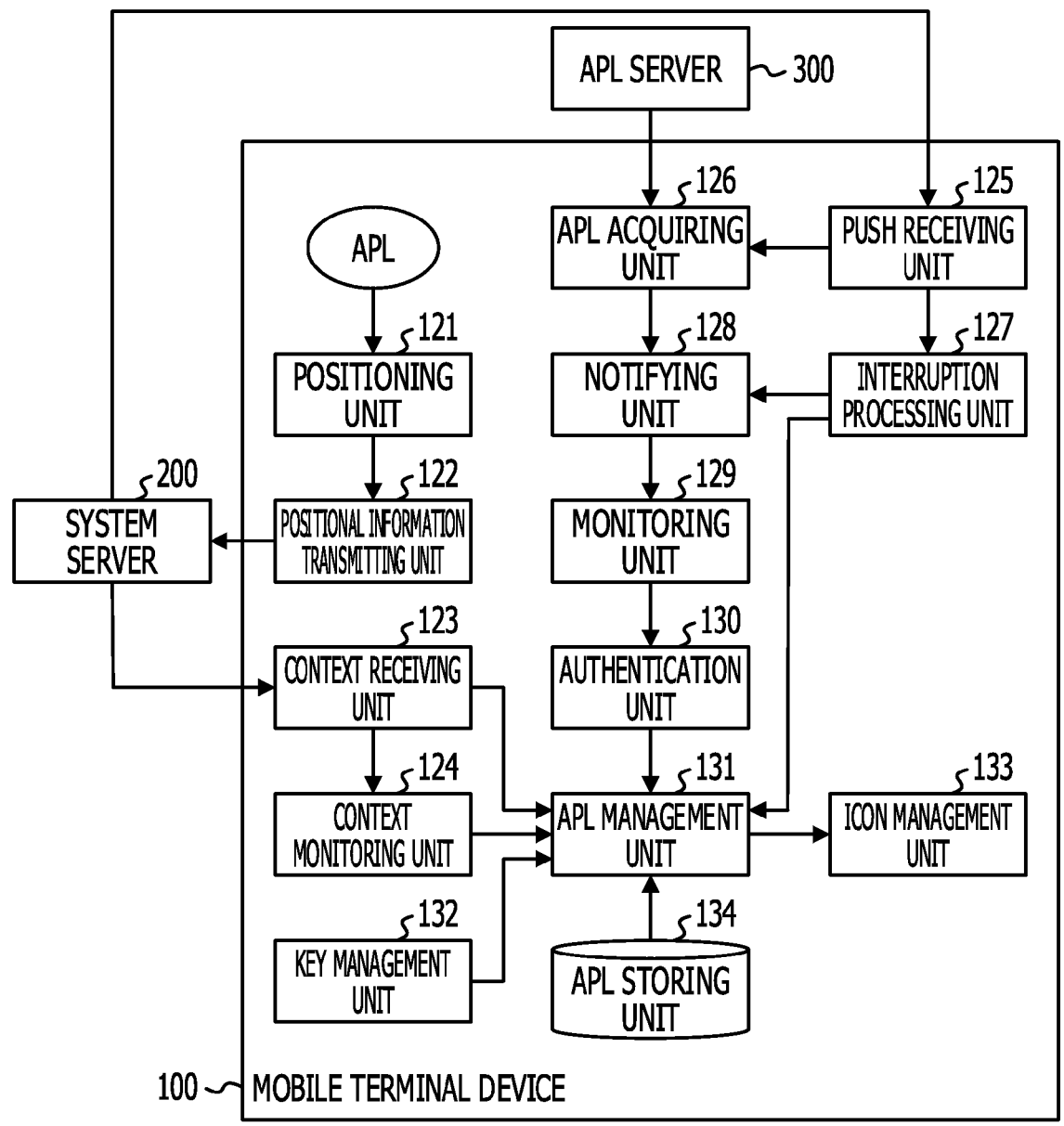
FIG. 3 is a functional block diagram of the mobile terminal device according to the first exemplary embodiment.

FIG. 3 is a functional block diagram of the mobile terminal device 100 according to the first exemplary embodiment.

As illustrated in FIG. 3, according to the present exemplary embodiment, the mobile terminal device 100 includes a positioning unit 121, a positional information transmitting unit 122, a context receiving unit 123, a context monitoring unit 124, a push receiving unit 125, an APL acquiring unit 126, an interruption processing unit 127, a notifying unit 128, a monitoring unit 129, an authentication unit 130, an APL management unit 131, a key management unit 132, an icon management unit 133, and an APL storing unit 134.

Each of the positioning unit 121, the positional information transmitting unit 122, the context receiving unit 123, the context monitoring unit 124, the push receiving unit 125, the APL acquiring unit 126, the interruption processing unit 127, the notifying unit 128, the monitoring unit 129, the authentication unit 130, the APL management unit 131, the key management unit 132, the icon management unit 133, and the APL storing unit 134 is realized by the CPU 101 that loads the control program 1200 into the main memory 102 and executes the control program 1200 read from the main memory 102.

The positioning unit 121 sends a positioning instruction to a positioning driver integrated into, for example, the OS 1100 at predetermined intervals and causes the sensor 112 to perform a positioning operation. In this manner, the positioning unit 121 acquires the positional information on the mobile terminal device 100. Alternatively, upon receiving an instruction from, for example, an application, the positioning unit 121 may acquire the positional information on the mobile terminal device 100. An example of the positional information is raw data, such as longitude and latitude information.

The positional information transmitting unit 122 transmits the positional information acquired by the positioning unit 121 to the system server 200. The system server 200 identifies the context of the mobile terminal device 100, that is, the location of the mobile terminal device 100, such as "work", "home", or "public" on the basis of the positional information transmitted from the positioning unit 121.

The context receiving unit 123 receives the context transmitted from the system server 200. As described above, the context indicates the location, such as "work", "home", or "public". In addition, the time information and the user information may be combined with the location.

The context monitoring unit 124 monitors whether the context has been changed on the basis of the context received by the context receiving unit 123.

The push receiving unit 125 receives a push message transmitted from the system server 200. The push message includes the name and attribute of an application associated with the push message. A push message serves as an execution trigger (an instruction indicating start of the application). Herein, the attribute of each of the applications is the context (the location) associated with the application. For example, a business application, such as an approval application used for a business, has an attribute of "work".

The APL acquiring unit 126 downloads, from the APL server 300, an application associated with the push message received by the push receiving unit 125.

The interruption processing unit 127 determines whether the attribute of the application matches the context of the mobile terminal device 100 on the basis of the context of the mobile terminal device 100 and the attribute of the application downloaded by the APL acquiring unit 126. If the attribute of the application matches the context of the mobile terminal device 100, the interruption processing unit 127 sends, to the APL management unit 131, an instruction to start the application. However, if the attribute of the application does not match the context of the mobile terminal device 100, the interruption processing unit 127 sends, to the notifying unit 128, an instruction to display the message.

Upon receiving the message display instruction from the interruption processing unit 127, the notifying unit 128 displays, on the desktop of the mobile terminal device 100, a switch button (that is, a context switch) used for determining whether the application downloaded by the APL acquiring unit 126 is started.

In addition, the notifying unit 128 may display, on the desktop of the mobile terminal device 100, a reception message indicating that the application has been downloaded by the APL acquiring unit 126. For example, if the attribute of the application is "work", the notifying unit 128 may display the message "Application of 'work' is received".

The monitoring unit 129 monitors whether a response to the context switch displayed on the desktop of the mobile terminal device 100 is input. For example, the monitoring unit 129 monitors whether the displayed context switch is touched (tapped). If a response to the context switch is detected, the monitoring unit 129 sends a response detection signal to the authentication unit 130.

Upon receiving the response detection signal from the monitoring unit 129, the authentication unit 130 displays a screen for user authentication (an authentication screen) on the desktop of the mobile terminal device 100. The authentication screen includes an input form for receiving, for example, a user ID and a password.

In addition, the authentication unit 130 determines whether the operator (the person who types information into the forms) is an authorized user on the basis of the information input to the authentication screen. If it is determined that the operator is an authorized user, the authentication unit 130 sends an instruction to start the application (an interruption trigger instruction) to the APL management unit 131.

While the present exemplary embodiment has been described with reference to the authentication unit 130 of the mobile terminal device 100, the authentication unit 130 is not an indispensable component of the authentication unit 130. For example, if the context of the mobile terminal device 100 is "home" having a low risk of the screen being peeked at by a stranger, displaying of the authentication screen may be removed. Alternatively, the authentication unit 130 may change the authentication level for the user in accordance with the context acquired from the context receiving unit 123. If the authentication unit 130 is not used, the monitoring unit 129 sends an APL execution instruction (an interruption trigger instruction) to the APL management unit 131.

The APL management unit 131 instructs the icon management unit 133 to display the icon of an application that matches the context acquired from the context receiving unit 123. For example, the context acquired from the context receiving unit 123 is "work", the APL management unit 131 instructs the icon management unit 133 to display the icon of an application having an attribute of "work".

In addition, upon receiving the execution instruction (the interruption trigger instruction) from the authentication unit 130, the APL management unit 131 replaces the icon of an application that is displayed on the desktop and that matches the context of the mobile terminal device 100 with the icon of an application having an attribute indicated by the execution instruction (the interruption trigger instruction). For example, when the context of the mobile terminal device 100 is "public" and if an execution instruction (an interruption trigger instruction) for an application having an attribute of "work" is received, the APL management unit 131 replaces the currently displayed icon of the application having an attribute of "public" with the icon of the application having an attribute of "work".

Furthermore, upon receiving an execution instruction from the interruption processing unit 127, the APL management unit 131 displays, on the desktop, an icon indicated by the execution instruction. For example, when the context of the mobile terminal device 100 is "work" and if an execution instruction for an application having an attribute of "work" is received, the APL management unit 131 displays, on the desktop, the icon of the application indicated by the execution instruction in addition to the currently displayed icon of the application having an attribute of "work".

After the APL management unit 131 displays, on the desktop, the icon of an application indicated by the execution instruction received from the interruption processing unit 127 or the authentication unit 130, the APL management unit 131 automatically starts the application and waits until the user operation performed on the application (user processing) is completed. In addition, if the APL management unit 131 detects completion of the user operation performed on the application, the APL management unit 131 automatically deletes the application. For example, if the application indicated by the execution instruction is an approval application, the APL management unit 131 automatically starts the approval application and displays an approval screen on the desktop. Thereafter, if the APL management unit 131 detects completion of an approval operation performed on the application, the APL management unit 131 automatically deletes the approval application from the mobile terminal device 100. According to the present exemplary embodiment, the APL management unit 131 deletes an application after detecting completion of the user operation. However, the processing performed after detecting completion of the user operation is not limited thereto.

Subsequently, after the APL management unit 131 detects completion of the user operation performed on the application indicated by the execution instruction (the interruption trigger instruction) received from the authentication unit 130, the APL management unit 131 replaces the icon of the application displayed on the desktop with the icon of an application having an attribute that matches the context of the mobile terminal device 100.

The key management unit 132 manages a decryption key of an application executed by the APL management unit 131. In addition, upon receiving a request from the APL management unit 131, the key management unit 132 sends the decryption key of a specified application to the APL management unit 131.

Upon receiving an icon display instruction from the APL management unit 131, the icon management unit 133 displays the icon of a specified application on the desktop of the mobile terminal device 100.

The APL storing unit 134 stores an application downloaded by the APL acquiring unit 126 in addition to an application preinstalled in the auxiliary memory 103 of the mobile terminal device 100.

Hardware of System Server

Figure 4:
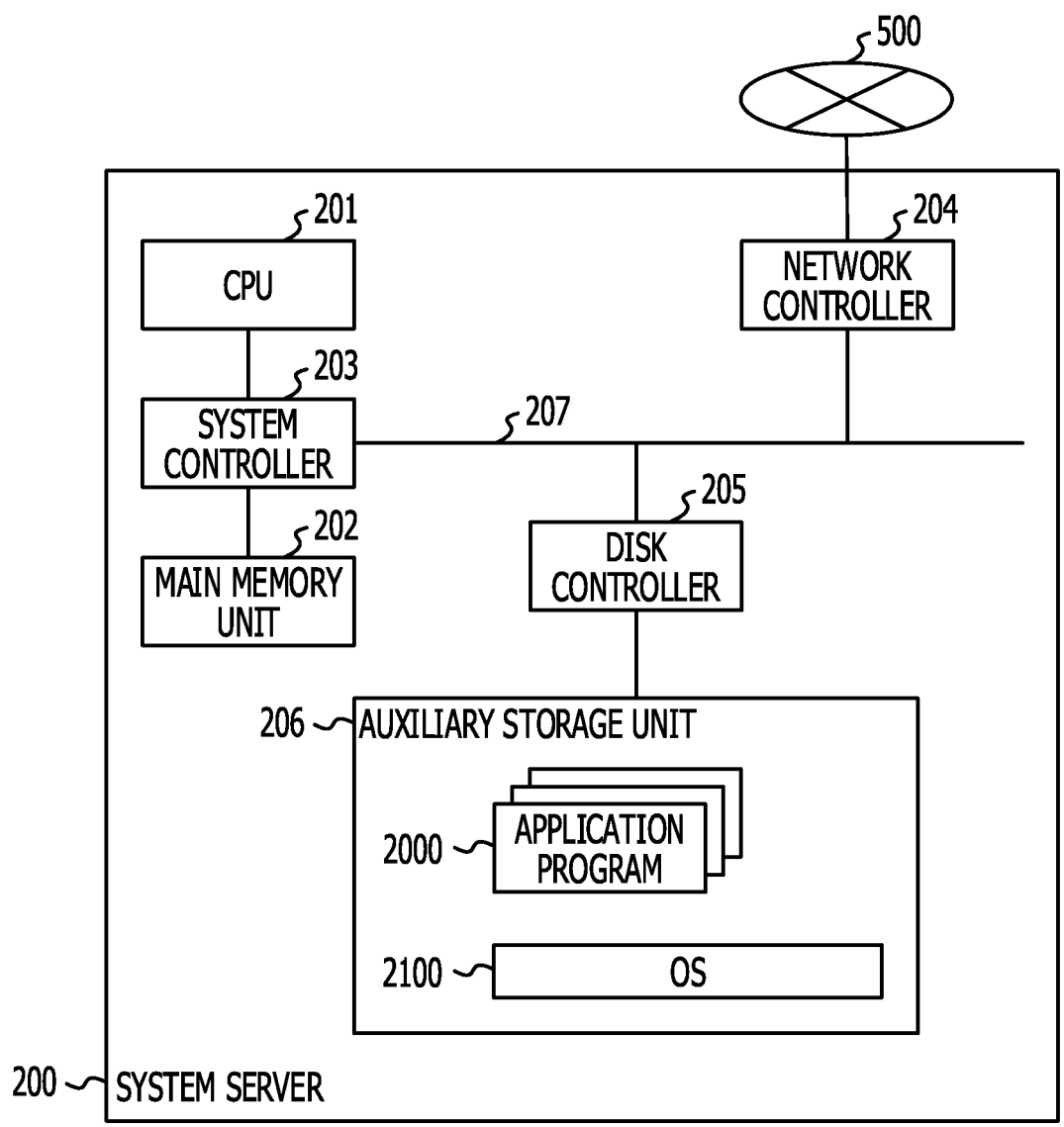
FIG. 4 is a schematic illustration of the hardware configuration of a system server according to the first exemplary embodiment.

FIG. 4 is a schematic illustration of the hardware configuration of the system server 200 according to the first exemplary embodiment.

As illustrated in FIG. 4, according to the present exemplary embodiment, the system server 200 includes the following hardware modules: a CPU 201, a main memory unit 202, a system controller 203, a network controller 204, a disk controller 205, and an auxiliary storage unit 206. These hardware modules are connected to one another via, for example, a bus 207.

The CPU 201 controls the variety of hardware modules of the system server 200. In addition, the CPU 201 loads a variety of programs stored in the auxiliary storage unit 206 into the main memory unit 202 and executes the programs loaded into the main memory unit 202. Thus, a variety of functions are realized. The functions are described in more detail below.

The main memory unit 202 stores the variety of programs executed by the CPU 201. In addition, the main memory unit 202 is used as a work area of the CPU 201. At that time, the main memory unit 202 stores various data used in processes performed by the CPU 201. For example, a RAM may be used as the main memory unit 202.

The system controller 203 is connected to the CPU 201 and the main memory unit 202. The system controller 203 controls data communication between the CPU 201 and the main memory unit 202 and data communication between the CPU 201 and the bus 207. In addition, the system controller 203 is connected to the network controller 204 and the disk controller 205 via the bus 207.

The network controller 204 is connected to the mobile terminal device 100, the APL server 300, and the PC 400 via the network 500. The network controller 204 communicates a variety of types of data with the mobile terminal device 100.

The auxiliary storage unit 206 is connected to the disk controller 205. The auxiliary storage unit 206 stores a variety of programs. Examples of the programs include an application program 2000 executed by the CPU 201 and an OS 2100 serving as an execution environment of the application program 2000. For example, a hard disk may be used as the auxiliary storage unit 206.

Functional Block of System Server

Figure 5:
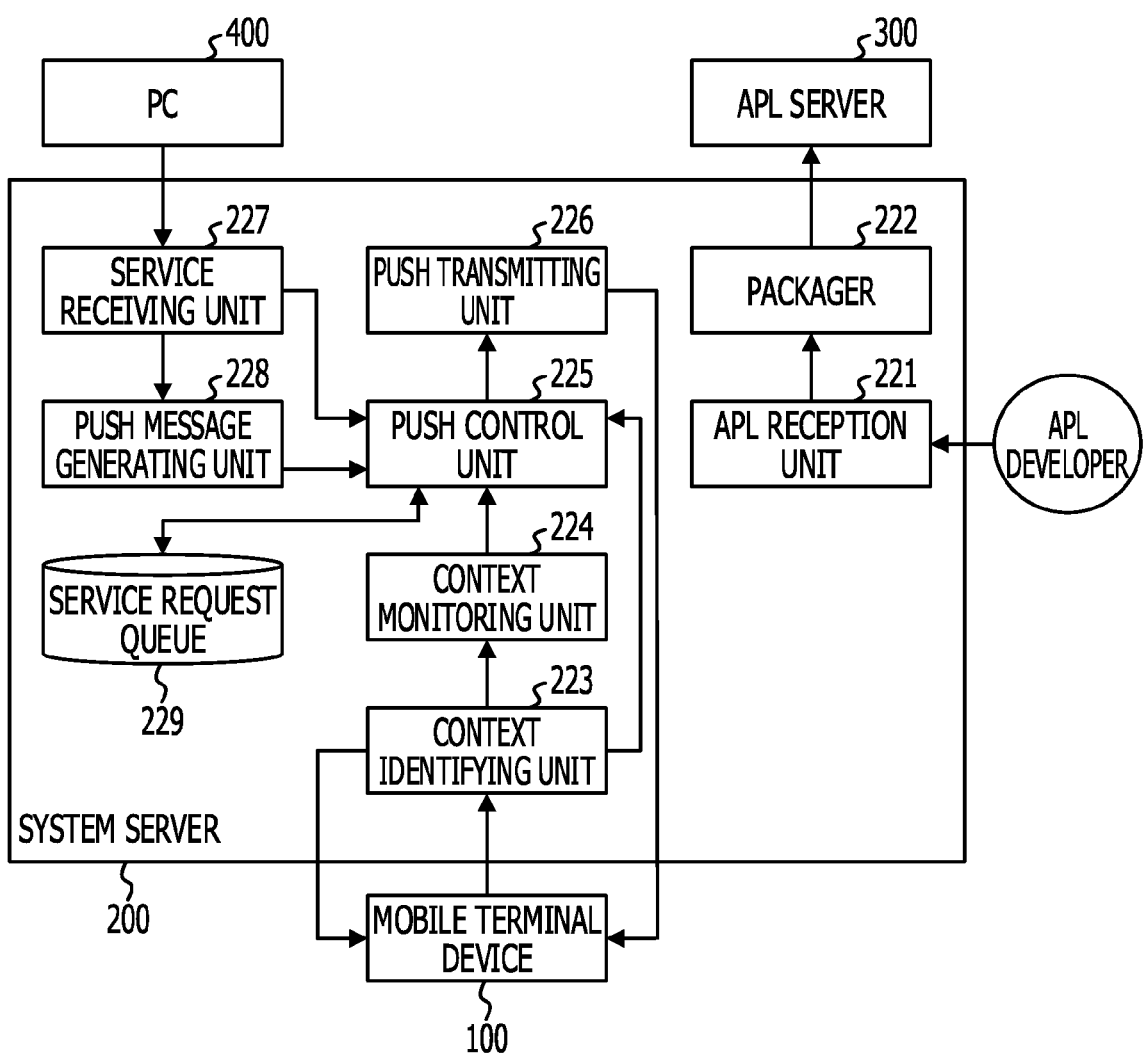
FIG. 5 is a functional block diagram of the system server according to the first exemplary embodiment.

FIG. 5 is a functional block diagram of the system server 200 according to the first exemplary embodiment.

As illustrated in FIG. 5, according to the present exemplary embodiment, the system server 200 includes an APL reception unit 221, a packager 222, a context identifying unit 223, a context monitoring unit 224, a push control unit 225, a push transmitting unit 226, a service receiving unit 227, a push message generating unit 228, and a service request queue 229.

Each of the APL reception unit 221, the packager 222, the context identifying unit 223, the context monitoring unit 224, the push control unit 225, the push transmitting unit 226, the service receiving unit 227, the push message generating unit 228, and the service request queue 229 is realized by the CPU 201 executing the application program 2000 and the OS 2100 stored in the auxiliary storage unit 206.

The APL reception unit 221 accepts registration of a new application developed by, for example, an application developer.

The packager 222 generates a uniform resource locator (URL) for identifying each of the applications accepted by the APL reception unit 221. In addition, the packager 222 encrypts an application accepted by the APL reception unit 221. Thereafter, the packager 222 links the application to the URL and stores the application in an auxiliary storage unit 306 of the APL server 300.

The context identifying unit 223 identifies the context of the mobile terminal device 100, that is, the location of the mobile terminal device 100 on the basis of the positional information transmitted from the mobile terminal device 100. For example, the mobile terminal device 100 is located within the campus of a company, the context identifying unit 223 identifies the context of the mobile terminal device 100 as the context "work".

In addition, the context identifying unit 223 notifies the mobile terminal device 100 of the context of the mobile terminal device 100. Thus, the mobile terminal device 100 recognizes the context thereof on the basis of the context sent from the context identifying unit 223.

The context monitoring unit 224 monitors the context identified by the context identifying unit 223. Thus, the context monitoring unit 224 determines whether the context of the mobile terminal device 100 has been changed. If the context of the mobile terminal device 100 has been changed, the context monitoring unit 224 sends, to the push control unit 225, context change information indicating that the context has been changed.

Upon receiving the context change information from the context monitoring unit 224, the push control unit 225 determines whether a service request having an attribute that matches the context of the mobile terminal device 100 is present in the service request queue 229 on the basis of the context identified by the context identifying unit 223. If it is determined that a service request having an attribute that matches the context of the mobile terminal device 100 is present in the service request queue 229, the push control unit 225 sends, to the push transmitting unit 226, a request for sending a push message related to the service request having an attribute that matches the context.

Furthermore, the push control unit 225 determines whether the service request received by the service receiving unit 227 has priority information attached thereto. If the service request has priority information attached thereto, the push control unit 225 regards a service activity indicated by the service request as an "interrupting service". Thus, the push control unit 225 sends, to the push transmitting unit 226, a request for transmitting a push message related to the service request having the priority information attached thereto. However, if the service request does not have priority information attached thereto, the push control unit 225 stores the service request having no priority information in the service request queue 229.

Upon receiving the request for transmitting the push message from the push control unit 225, the push transmitting unit 226 sends a push message generated by the push message generating unit 228 to the mobile terminal device 100 via the network 500.

The service receiving unit 227 receives the service request transmitted from, for example, the PC 400. In this example, the service request is an approval request to be sent to a manager. In some cases, the service request has priority information attached thereto by the requester (the PC 400).

The push message generating unit 228 generates a push message to be sent to the mobile terminal device 100 on the basis of the service request received by the service receiving unit 227. The push message includes a URL linked to an application that achieves the service indicated by the service request. The URL has the name and the attribute of the application attached thereto. The attribute of the application is similar to that of the service request. For example, if an approval request is sent from the PC 400 of the requester as a service request having the priority information attached thereto, the push message generating unit 228 generates a push message having the name "approval APL" and an attribute of "work". The name "approval APL" is the name of an approval application that performs approval (the service indicated by the service request).

The service request queue 229 stores a service request that is determined to have no priority information by the push control unit 225 in association with the attribute of the service request. Each of the service requests stored in the service request queue 229 is sent to the mobile terminal device 100 when the context of the mobile terminal device 100 matches the attribute of the service request.

Hardware of APL Server

Figure 6:
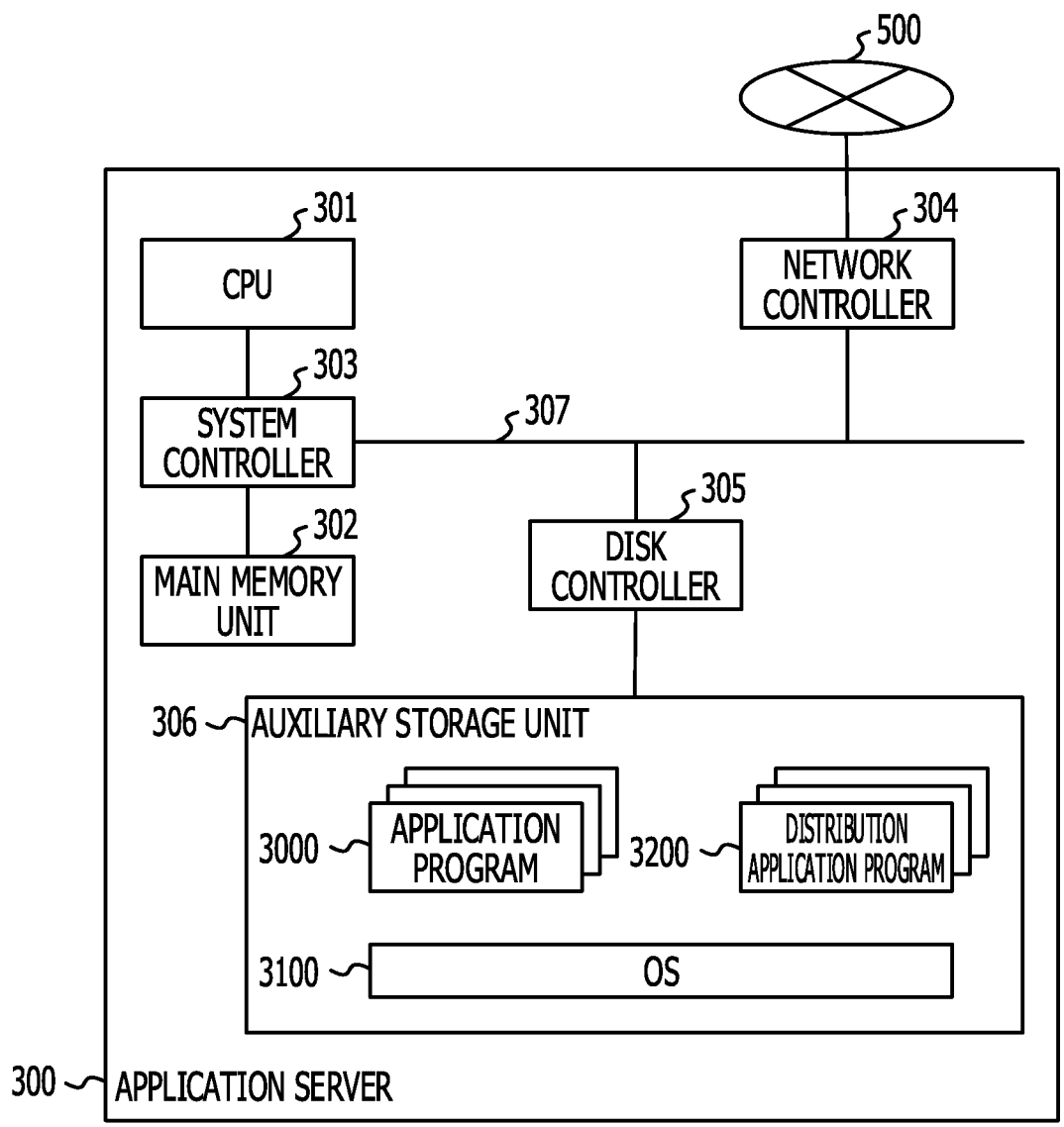
FIG. 6 is a schematic illustration of the hardware configuration of an APL server according to the first exemplary embodiment.

FIG. 6 is a schematic illustration of the hardware configuration of the APL server 300 according to the first exemplary embodiment.

As illustrated in FIG. 6, according to the present exemplary embodiment, the APL server 300 includes the following hardware modules: a CPU 301, a main memory unit 302, a system controller 303, a network controller 304, a disk controller 305, and an axillary storage unit 306. These hardware modules are connected to one another via, for example, a bus 307.

The CPU 301 controls the variety of hardware modules of the APL server 300. In addition, the CPU 301 loads a variety of programs stored in the auxiliary storage unit 306 into the main memory unit 302 and executes the programs loaded into the main memory unit 302. Thus, a variety of functions are realized.

The main memory unit 302 stores a variety of programs executed by the CPU 301. In addition, the main memory unit 302 is used as a work area of the CPU 301. At that time, the main memory unit 302 stores various data used in processes performed by the CPU 301. For example, a RAM may be used as the main memory unit 302.

The system controller 303 is connected to the CPU 301 and the main memory unit 302. The system controller 303 controls data communication between the CPU 301 and the main memory unit 302 and data communication between the CPU 301 and the bus 307. In addition, the system controller 303 is connected to the network controller 304 and the disk controller 305 via the bus 307.

The network controller 304 is connected to the mobile terminal device 100 via the network 500. The network controller 304 communicates a variety of types of data with the mobile terminal device 100.

The auxiliary storage unit 306 is connected to the disk controller 305. The auxiliary storage unit 306 stores a variety of programs. Examples of the programs include an application program 3000 executed by the CPU 301 and an OS 3100 serving as an execution environment of the application program 3000. In addition, a distribution application program 3200 developed by an application developer is stored in the axillary storage unit 306. For example, a hard disk may be used as the auxiliary storage unit 306.

Functional Blocks of APL Server

Figure 7:
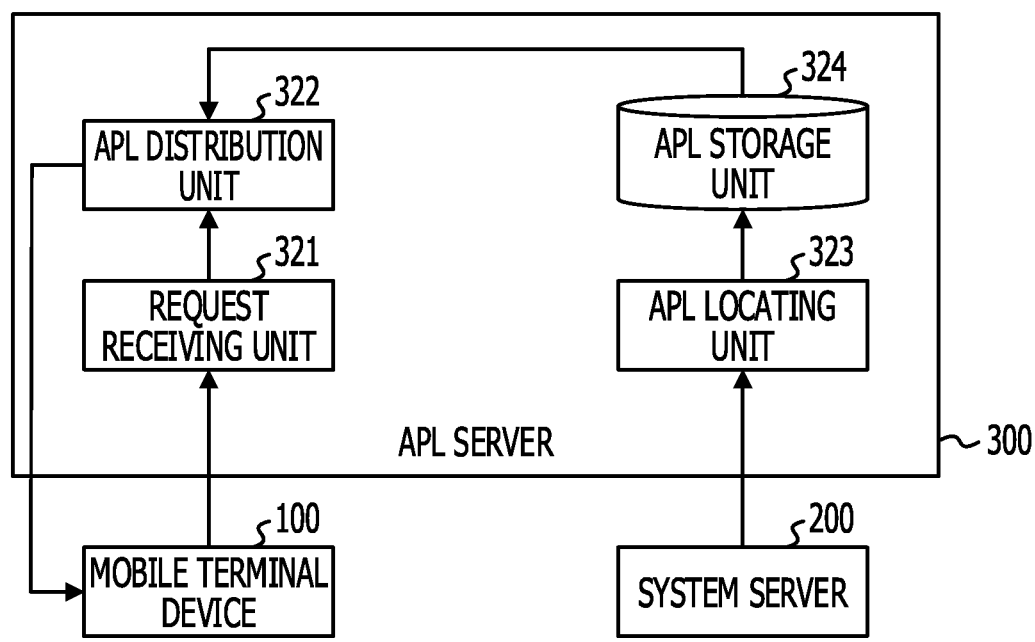
FIG. 7 is a functional block diagram of the APL server according to the first exemplary embodiment.

FIG. 7 is a functional block diagram of the APL server 300 according to the first exemplary embodiment.

As illustrated in FIG. 7, according to the present exemplary embodiment, the APL server 300 includes a request receiving unit 321, an APL distribution unit 322, an APL locating unit 323, and an APL storage unit 324.

Each of the request receiving unit 321, the APL distribution unit 322, the APL locating unit 323, and an APL storage unit 324 is realized by the CPU 301 loading the application program 3000 and the OS 3100 stored in the axillary storage unit 306 into the main memory unit 302 and executing the variety of programs loaded into the main memory unit 302.

The request receiving unit 321 receives a download request from the mobile terminal device 100 and sends, to the APL distribution unit 322, the URL linked to an application to be distributed to the mobile terminal device 100.

The APL distribution unit 322 selects one of the applications stored in the APL storage unit 324 on the basis of the URL sent from the request receiving unit 321 and distributes the selected application to the mobile terminal device 100.

The APL locating unit 323 stores the application sent from the system server 200, that is, a new application developed by an application developer in the APL storage unit 324 in association with the URL of the application.

Desktop Switching Process Triggered by Context Change (Mobile Terminal Device)

Figure 8:
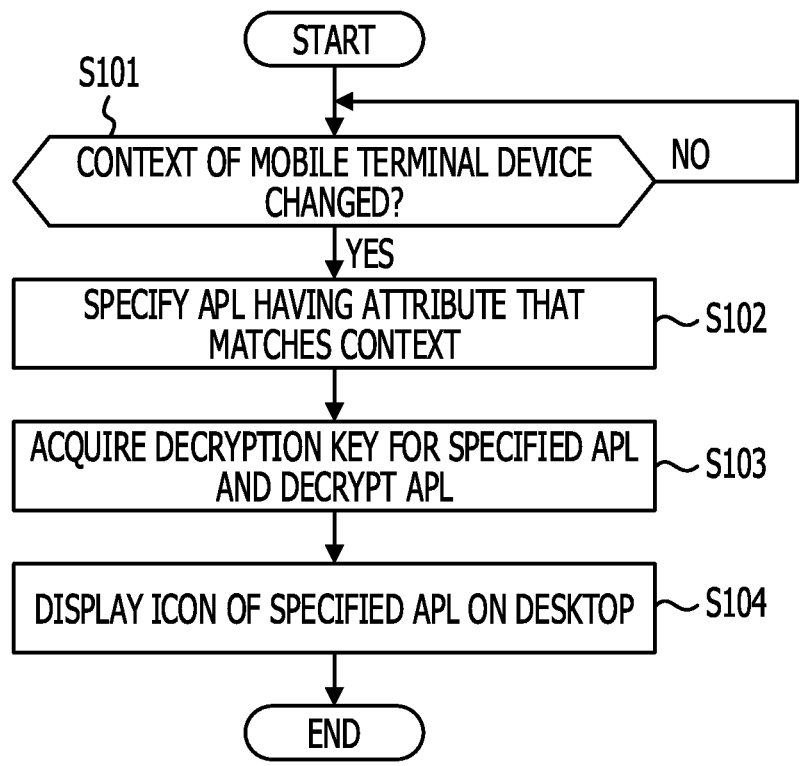
FIG. 8 is a flowchart of the process performed by the mobile terminal device according to the first exemplary embodiment.

FIG. 8 is a flowchart of the process performed by the mobile terminal device 100 according to the first exemplary embodiment.

As illustrated in FIG. 8, the context monitoring unit 124 determines whether the context has been changed on the basis of the context of the mobile terminal device 100 received from the context receiving unit 123 (step S101).

If the context monitoring unit 124 determines that the context has not been changed (No in step S101), the context monitoring unit 124 continues to monitor a change in the context (step S101).

However, if the context monitoring unit 124 determines that the context has been changed (Yes in step S101), the APL management unit 131 selects every one of the applications that is stored in the APL storing unit 134 and that has an attribute matching the context received by the context receiving unit 123 (step S102). For example, if the context is changed from "public" to "work", all of the applications having an attribute of "work" are selected.

Subsequently, the APL management unit 131 acquires the decryption key of each of the selected applications from the key management unit 132. The APL management unit 131 decrypts each of the selected applications using the acquired decryption key of the application (step S103).

Thereafter, the APL management unit 131 instructs the icon management unit 133 to display the icon on the desktop (step S104). In this manner, the icon of each of the selected applications having an attribute that matches the context is displayed on the desktop of the mobile terminal device 100. That is, the desktop of the mobile terminal device 100 is switched to the desktop corresponding to the context.

APL Push Process Triggered by Context Change (System Server)

Figure 9:
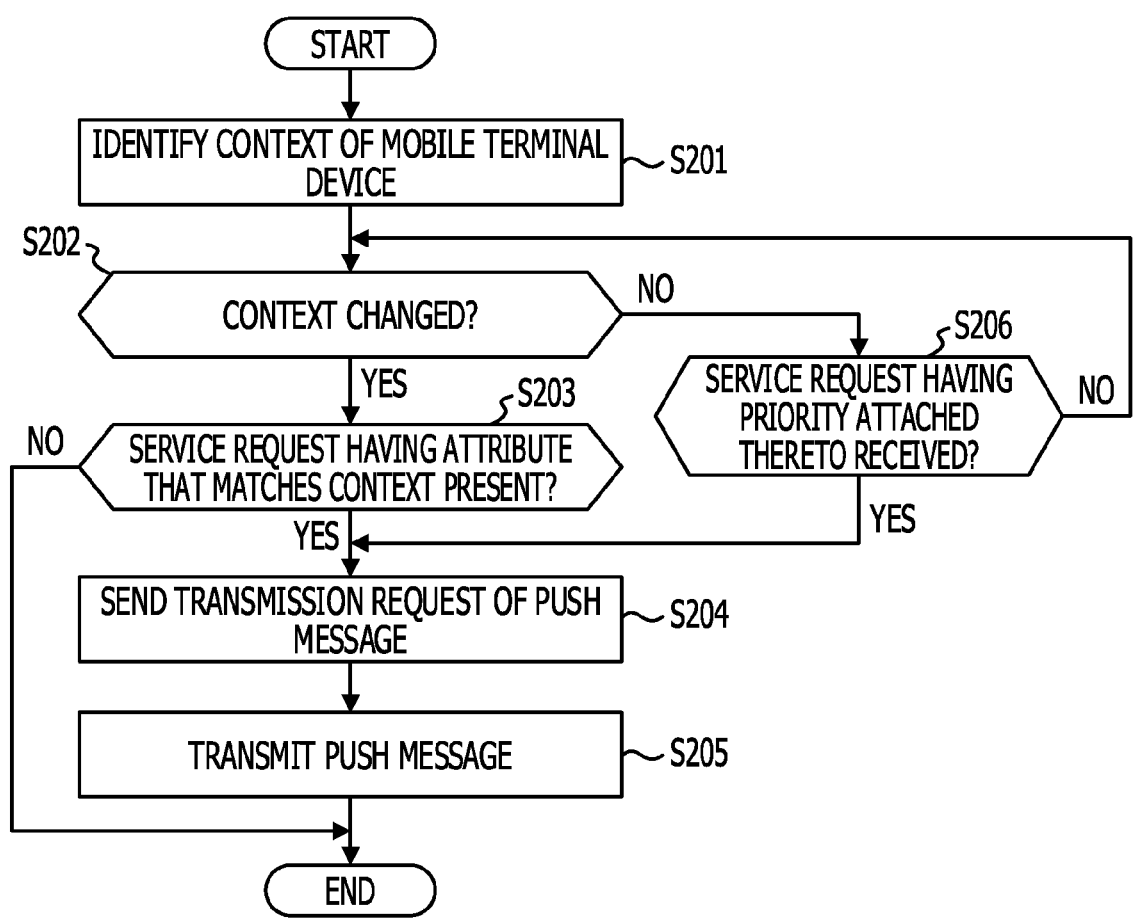
FIG. 9 is a flowchart of the process performed by the system server according to the first exemplary embodiment.

FIG. 9 is a flowchart of the process performed by the system server 200 according to the first exemplary embodiment.

As illustrated in FIG. 9, the context identifying unit 223 identifies the context of the mobile terminal device 100 on the basis of the positional information transmitted from the mobile terminal device 100 (step S201).

Subsequently, the context monitoring unit 224 monitors whether the context identified by the context identifying unit 223 has been changed (step S202).

If the context monitoring unit 224 determines that the context of the mobile terminal device 100 has been changed (Yes in step S202), the push control unit 225 determines whether a service request having an attribute that matches the context of the mobile terminal device 100 is present in the service request queue 229 (step S203).

If it is determined that a service request having an attribute that matches the context of the mobile terminal device 100 is present (Yes in step S203), the push control unit 225 sends, to the push transmitting unit 226, a transmission request of a push message (step S204).

Upon receiving the transmission request of a push message from the push control unit 225, the push transmitting unit 226 transmits a push message to the mobile terminal device 100 (step S205). Note that the push message is generated by the push message generating unit 228.

However, if it is determined that a service request having an attribute that matches the context of the mobile terminal device 100 is not present (No in step S203), the push control unit 225 completes the APL push process.

Furthermore, according to the present exemplary embodiment, if it is determined that the context of the mobile terminal device 100 has not been changed (No in step S202), the push control unit 225 determines whether an "interrupting service" has occurred, that is, whether a service request having the priority information attached thereto has been received (step S206).

If it is determined that a service request having the priority information attached thereto has been received (Yes in step S206), the push control unit 225 sends a transmission request of the push message to the push transmitting unit 226 (step S204). In this manner, if the system server 200 receives the service request having the priority information attached thereto, the system server 200 sends the push message regardless of the context of the mobile terminal device 100.

However, if it is determined that a service request having the priority information attached thereto has not been received (No in step S206), the context monitoring unit 224 continues to monitor a change in the context of the mobile terminal device 100 (step S202).

APL Push Process Triggered by Change in Context (Mobile Terminal Device)

Figure 10:
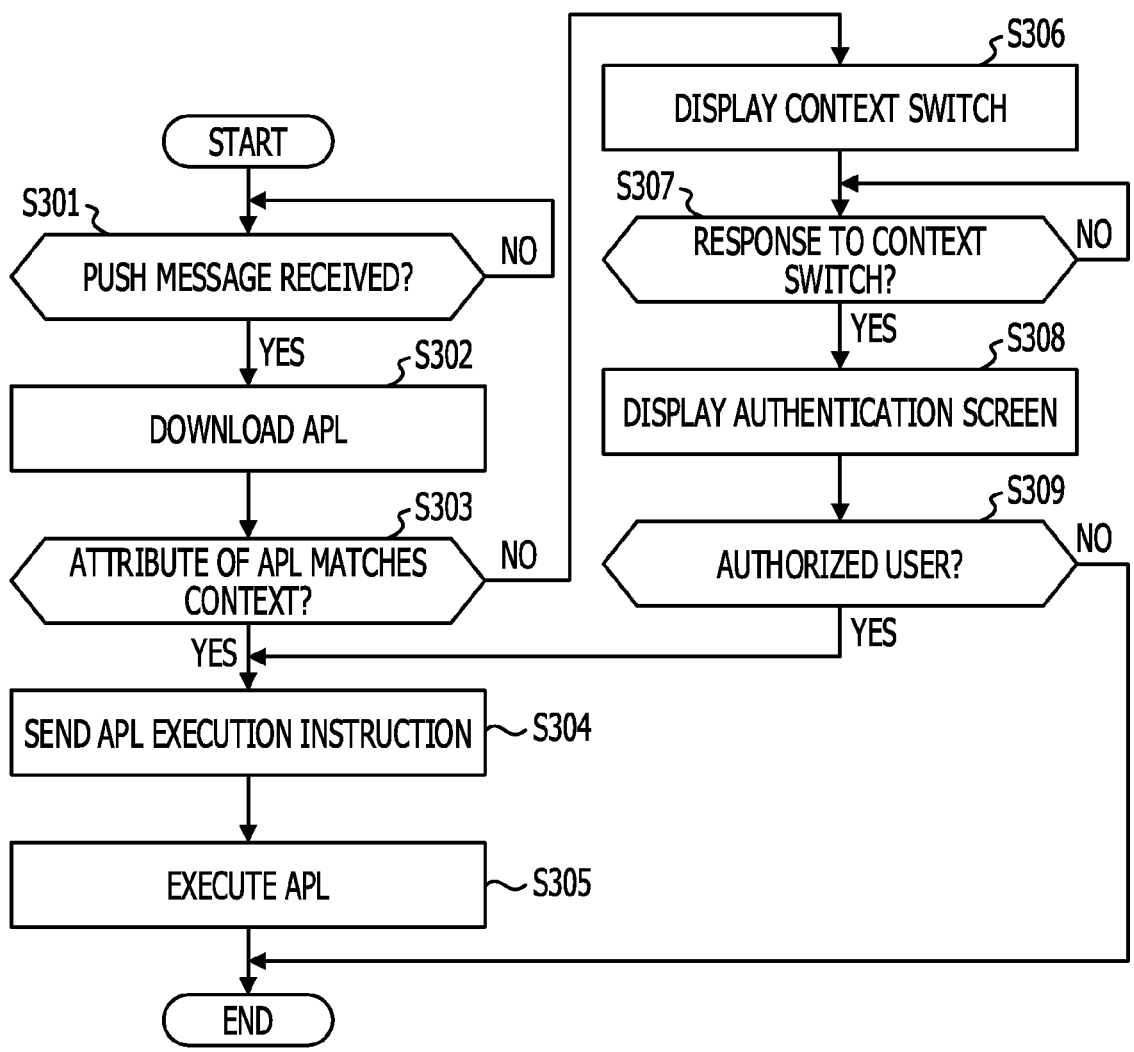
FIG. 10 is a flowchart of the process performed by the mobile terminal device according to the first exemplary embodiment.

FIG. 10 is a flowchart of the process performed by the mobile terminal device 100 according to the first exemplary embodiment. FIG. 11 is a schematic illustration of switching of the desktop of the mobile terminal device 100 according to the first exemplary embodiment.

As illustrated in FIG. 10, the push receiving unit 125 determines whether the push message has been received from the system server 200 (step S301).

If it is determined that a push message has not been received (No in step S301), the push receiving unit 125 continues to monitor whether a push message has been received (step S301).

However, if it is determined that a push message has been received (Yes in step S301), the APL acquiring unit 126 downloads, from the APL server 300, the application specified by the URL of the push message received by the push receiving unit 125 (step S302).

Subsequently, the interruption processing unit 127 determines whether the attribute of the application downloaded from the APL server 300 matches the context of the mobile terminal device 100 (step S303).

If it is determined that the attribute of the application matches the context of the mobile terminal device 100 (Yes in step S303), the interruption processing unit 127 sends an APL execution instruction to the APL management unit 131 (step S304).

Upon receiving the APL execution instruction from the interruption processing unit 127, the APL management unit 131 decrypts the application using the decryption key acquired from the key management unit 132 and executes the decrypted application (step S305).

However, if it is determined that the attribute of the application does not match the context of the mobile terminal device 100 (No in step S303), the interruption processing unit 127 sends a message display instruction to the notifying unit 128. Thus, the context switch is displayed on the desktop of the mobile terminal device 100 (step S306). At that time, the notifying unit 128 may display the received message on the desktop of the mobile terminal device 100 in addition to the context switch.

Thereafter, the monitoring unit 129 monitors whether a response to the context switch displayed on the desktop of the mobile terminal device 100 is input, for example, whether the context switch is touched (tapped) (step S307).

If a response to the context switch is not detected (No in step S307), the monitoring unit 129 continues to monitor a response to the context switch (step S307).

Figure 11A:
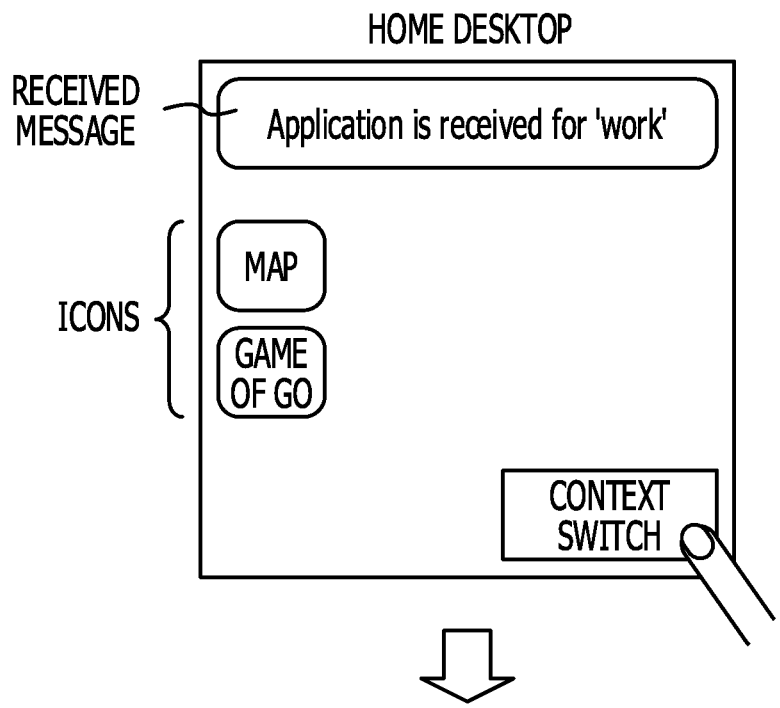
FIGS. 11A and 11B are schematic illustrations of switching of the desktop of the mobile terminal device according to the first exemplary embodiment.

However, if, as illustrated in FIG. 11A, a response to the context switch is detected (for example, if the user touches the context switch) (Yes in step S307), the authentication unit 130 displays the authentication screen on the desktop of the mobile terminal device 100 (step S308).

Subsequently, the authentication unit 130 determines whether the operator (the inputter) is an authorized user on the basis of, for example, the input user ID and password (step S309).

If it is determined that the operator is an authorized user (Yes in step S309), the authentication unit 130 sends the APL execution instruction (the interruption trigger instruction) to the APL management unit 131 (step S304). Upon receiving the APL execution instruction (the interruption trigger instruction) from the authentication unit 130, the APL management unit 131 decrypts the application using the decryption key acquired from the key management unit 132 and executes the decrypted application (step S305).

Figure 11B:
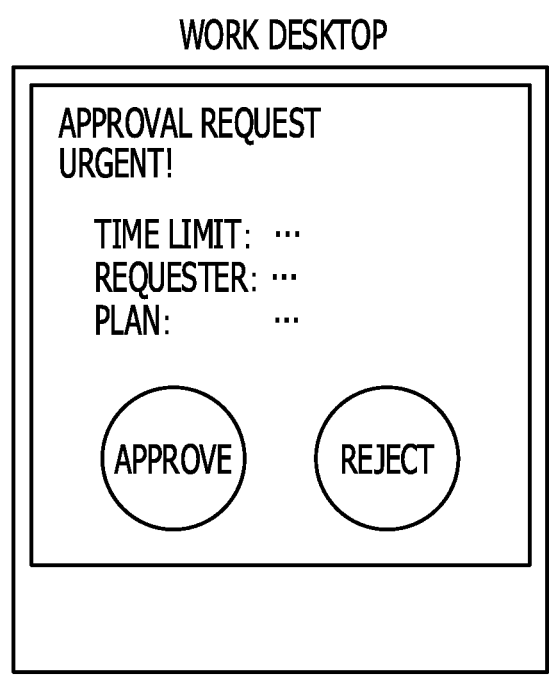

In this manner, as illustrated in FIG. 11B, an APL operation screen (an input screen) of the application downloaded from the APL server 300 is displayed on the desktop of the mobile terminal device 100.

However, if it is determined that the operator is not an authorized user (No in step S309), the authentication unit 130 completes the APL push process.

According to the present exemplary embodiment, it is determined whether the attribute of an application downloaded from the APL server 300 into the mobile terminal device 100 matches the context of the mobile terminal device 100. If the attribute of an application does not match the context of the mobile terminal device 100, the context switch is displayed on the desktop of the mobile terminal device 100. Only when a response to the context switch is detected, the application downloaded from the APL server 300 to the mobile terminal device 100 is executed.

Thus, when the attribute of the mobile terminal device 100 is, for example, "public" and if an application having an attribute of "work" is automatically downloaded into the mobile terminal device 100, the application is not executed when downloaded. Accordingly, the information regarding a business request is not suddenly displayed on the desktop of the mobile terminal device 100. As a result, for example, even when an approval request is sent to a user traveling in a public transportation system (for example, a train), a risk of a third party around the mobile terminal device 100 peeking at the information regarding the business request can be minimized.

Second Exemplary Embodiment

A mobile terminal device 100A according to a second exemplary embodiment is described below with reference to FIGS. 12 and 13. Note that descriptions of the configurations and operations that are similar to those of the first exemplary embodiment are not repeated.

Figure 12:
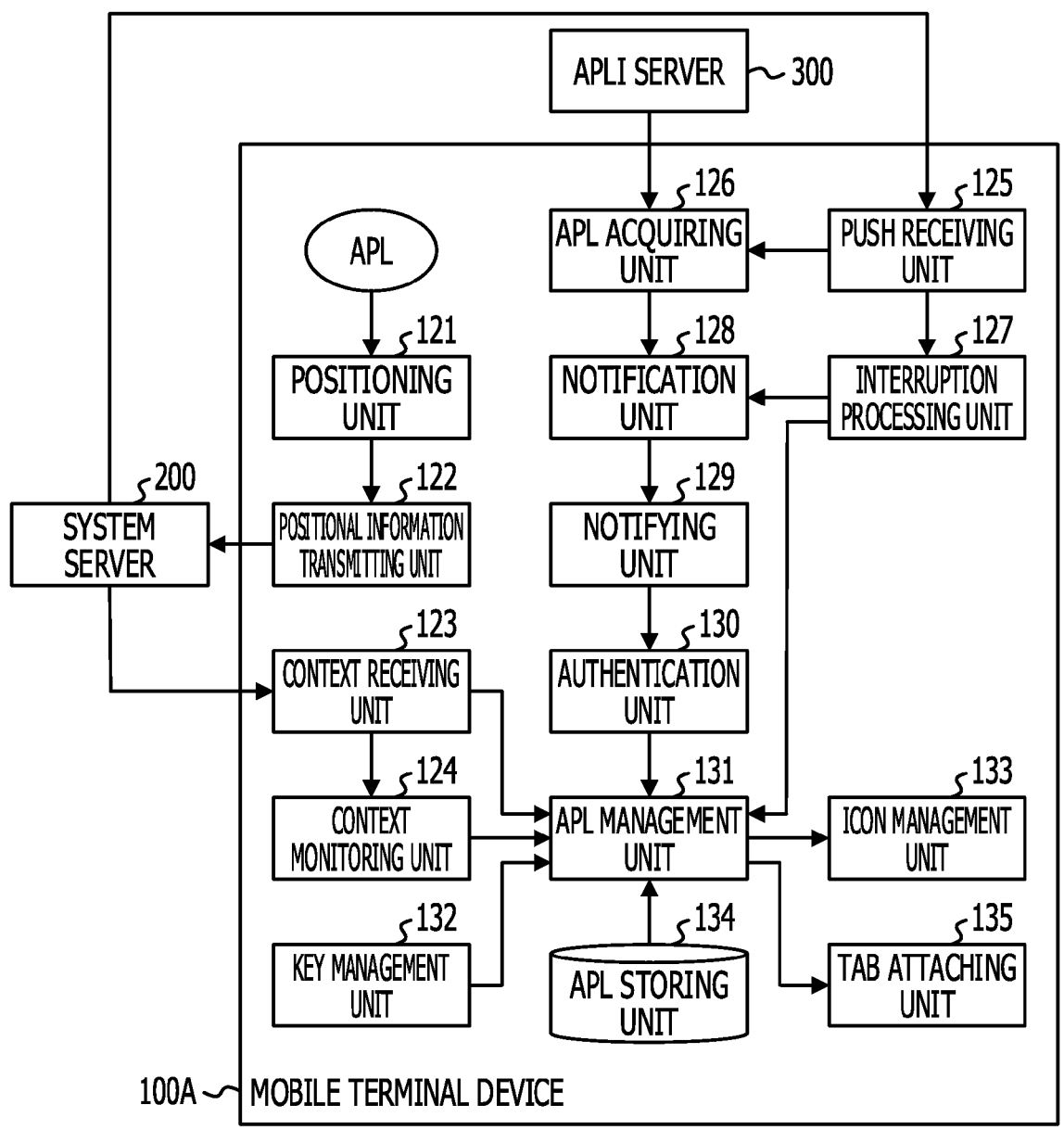
FIG. 12 is a functional block diagram of a mobile terminal device according to a second exemplary embodiment.

FIG. 12 is a functional block diagram of the mobile terminal device 100A according to the second exemplary embodiment. FIG. 13 is a schematic illustration of the desktop of the mobile terminal device 100A according to the second exemplary embodiment.

As illustrated in FIG. 12, according to the present exemplary embodiment, the mobile terminal device 100A additionally includes a tab attaching unit 135. The tab attaching unit 135 is realized by the CPU 101 loading a control program 1200A into the main memory 102 and executing the control program 1200A loaded into the main memory 102.

Figure 13A:
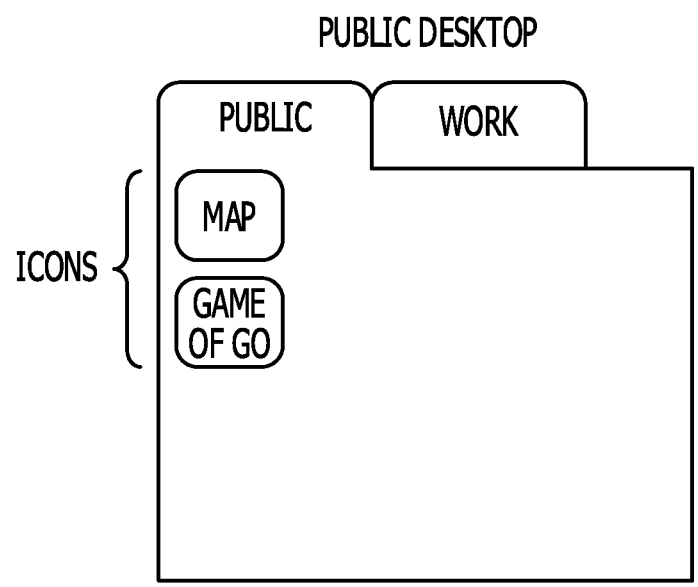
FIGS. 13A and 13B are schematic illustrations of the desktop of the mobile terminal device according to the second exemplary embodiment.
Figure 13B:
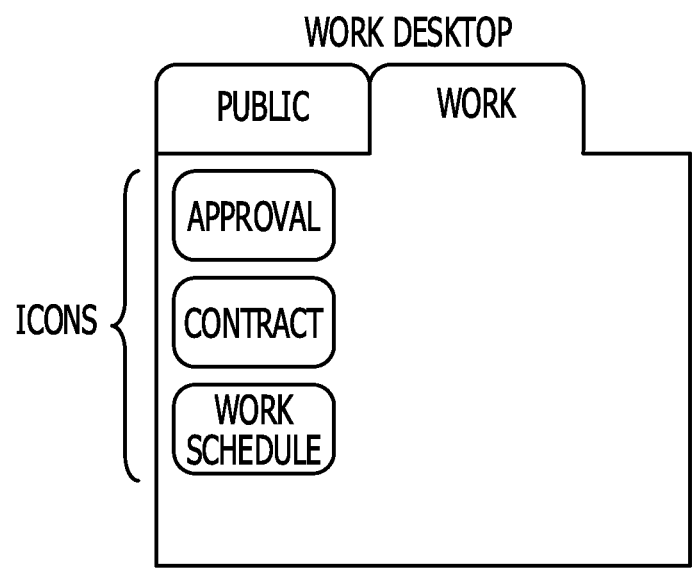

The tab attaching unit 135 attaches, to the desktop of the mobile terminal device 100A, a tab displaying the attribute of an application having the icon displayed on the desktop of the mobile terminal device 100A. For example, when the icon of an application having an attribute of "public" is displayed, the tab attaching unit 135 attaches a tab displaying "public" to the desktop, as illustrated in FIG. 13A. When the icon of an application having an attribute of "work" is displayed, the tab attaching unit 135 attaches a tab displaying "work" to the desktop, as illustrated in FIG. 13B.

Note that when an interrupting service does not occur, the icon of an application having an attribute that matches the context of the mobile terminal device 100A is displayed. Accordingly, the tab attaching unit 135 attaches a tab displaying the context of the mobile terminal device 100A to the desktop. However, when an interrupting service occur, the icon of an application having an attribute that does not match the context of the mobile terminal device 100A is displayed. Accordingly, the tab attaching unit 135 attaches, to the desktop, a tab that differs from the context of the mobile terminal device 100A, that is, a tab displaying the attribute of the application related to the interrupting service.

According to the present exemplary embodiment, a tab displaying the attribute of an application having an icon displayed on the desktop of the mobile terminal device 100A is attached to the desktop. Accordingly, the user can easily recognize the attribute of the application having an icon displayed on the desktop.

Third Exemplary Embodiment

A mobile terminal device 100B according to a third exemplary embodiment is described below with reference to FIGS. 14 and 15. Note that descriptions of the configurations and operations that are similar to those of the first exemplary embodiment are not repeated.

Figure 14:
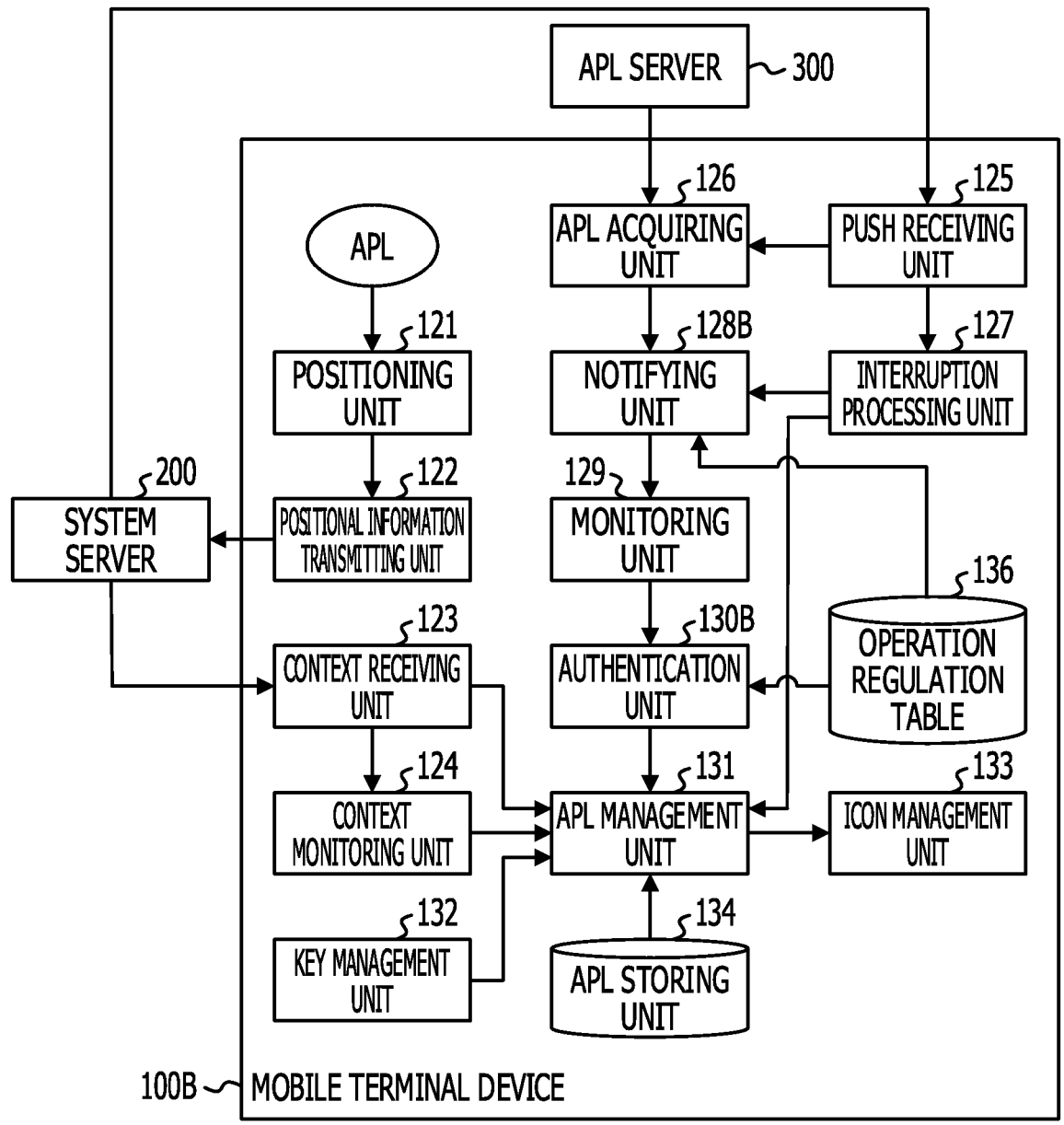
FIG. 14 is a functional block diagram of a mobile terminal device according to a third exemplary embodiment.

FIG. 14 is a functional block diagram of the mobile terminal device 100B according to the third exemplary embodiment.

As illustrated in FIG. 14, according to the present exemplary embodiment, the mobile terminal device 100B includes an operation regulation table 136. Furthermore, the mobile terminal device 100B includes a notifying unit 128B and an authentication unit 130B that differ from the notifying unit 128 and the authentication unit 130 of the first exemplary embodiment. The operation regulation table 136, the notifying unit 128B, and the authentication unit 130B are realized by the CPU 101 loading a control program 1200B into the main memory 102 and executing the control program 1200B loaded into the main memory 102.

Figure 15:
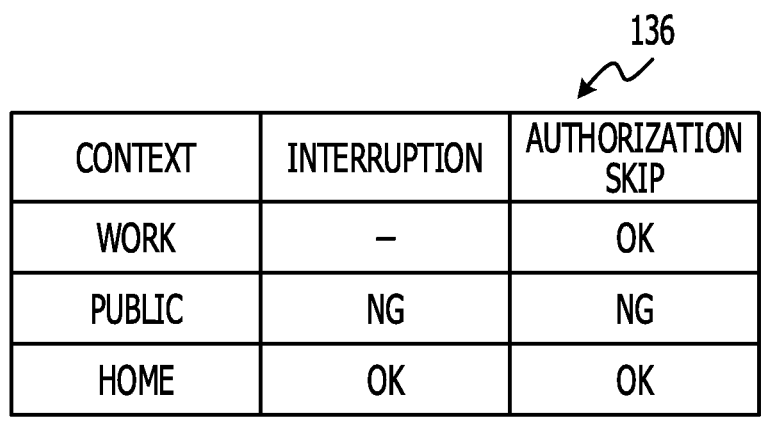
FIG. 15 is a schematic illustration of an operation regulation table according to the third exemplary embodiment.

FIG. 15 is a schematic illustration of the operation regulation table 136 according to the third exemplary embodiment.

As illustrated in FIG. 15, according to the present exemplary embodiment, the operation regulation table 136 associates the context of the mobile terminal device 100B with information "interruption" and "authentication skip". The information "interruption" is used to determine whether the context switch is displayed on the desktop of the mobile terminal device 100B. The information "authentication skip" is used to determine whether the authentication screen is displayed on the desktop of the mobile terminal device 100B.

The notifying unit 128B determines whether the context switch is displayed on the desktop of the mobile terminal device 100B on the basis of the context of the mobile terminal device 100B and information in "interruption" of the operation regulation table 136 ("YES" or "NO"). That is, if "interruption" associated with the context of the mobile terminal device 100B is YES, the notifying unit 128B displays the context switch on the desktop. Note that in the operation regulation table 136 according to the present exemplary embodiment, "interruption" associated with "public" is set to "NO".

The authentication unit 130B determines whether the authentication screen is displayed on the desktop of the authentication unit 130B on the basis of the context of the authentication unit 100B and the information on "authentication skip" of the operation regulation table 136 ("YES" or "NO"). That is, if "authentication skip" associated with the context of the mobile terminal device 100B is "YES", the authentication unit 130B does not display the authentication screen. Note that in the operation regulation table 136 according to the present exemplary embodiment, "authentication skip" associated with "home" is set to "YES".

According to the present exemplary embodiment, if the context of the mobile terminal device 100B is "public", "interruption" of the operation regulation table 136 is set to "NO". In this manner, when the context of the mobile terminal device 100B is "public", displaying of the context switch on the desktop of the mobile terminal device 100B is inhibited. Accordingly, when the user is traveling on a train and if a business application is automatically downloaded, a risk of the user unintentionally tapping the context switch is minimized. Thus, sudden display of a business application on the desktop and a risk of the business application being peeked at can be reliably protected.

In addition, according to the present exemplary embodiment, if the context of the mobile terminal device 100B is "home", "authentication skip" of the operation regulation table 136 is set to "YES". In this manner, when the context of the mobile terminal device 100B is "home", displaying of the authentication screen on the desktop of the mobile terminal device 100B is skipped. Accordingly, when the user is at home where a risk of the screen being peeked at is low, input of the user ID and password is unnecessary. Thus, an annoying user authentication operation can be reduced.

Fourth Exemplary Embodiment

A mobile terminal device 100C according to a fourth exemplary embodiment is described below with reference to FIGS. 16 and 17. Note that descriptions of the configurations and operations that are similar to those of the third exemplary embodiment are not repeated.

Figure 16:
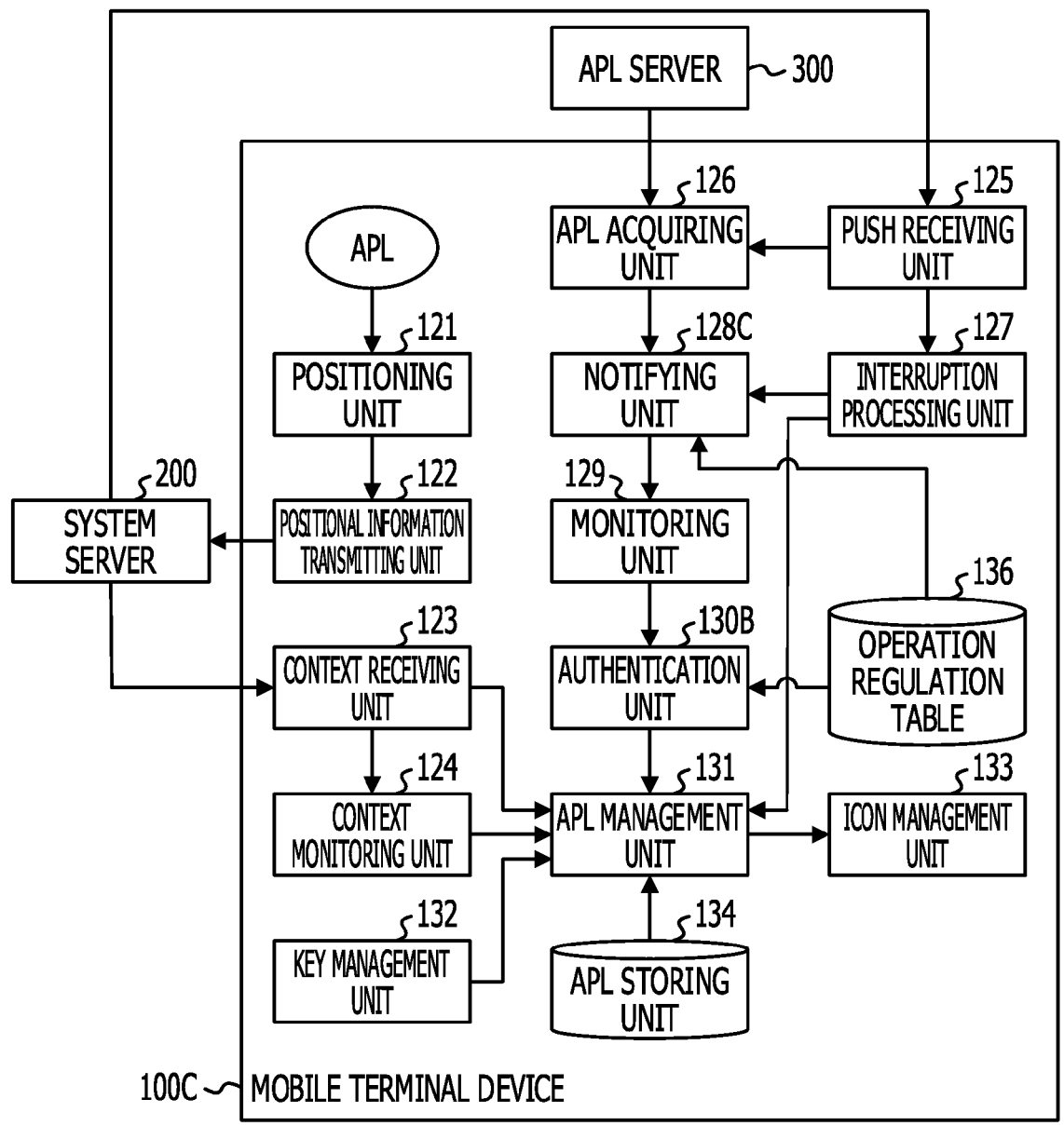
FIG. 16 is a functional block diagram of a mobile terminal device according to a fourth exemplary embodiment.

FIG. 16 is a functional block diagram of the mobile terminal device 100C according to the fourth exemplary embodiment. FIG. 17 illustrates switching of the desktop of the mobile terminal device 100C according to the fourth exemplary embodiment.

As illustrated in FIG. 16, according to the present exemplary embodiment, the mobile terminal device 100C includes a notifying unit 128C that differs from the notifying unit 128B of the third exemplary embodiment. The notifying unit 128C is realized by the CPU 101 loading a control program 1200C into the main memory 102 and executing the control program 1200C loaded into the main memory 102.

The notifying unit 128C displays the context switch on the desktop of the mobile terminal device 100C after the context of the mobile terminal device 100C matches the context for which "interruption" in the operation regulation table 136 is "YES". That is, the notifying unit 128C does not display the context switch on the desktop of the mobile terminal device 100C until the context of the mobile terminal device 100C matches the context for which "interruption" in the operation regulation table 136 is "YES". Note that the notifying unit 128C may display the received message on the desktop of the mobile terminal device 100C regardless of the context of the mobile terminal device 100C.

Figure 17A:
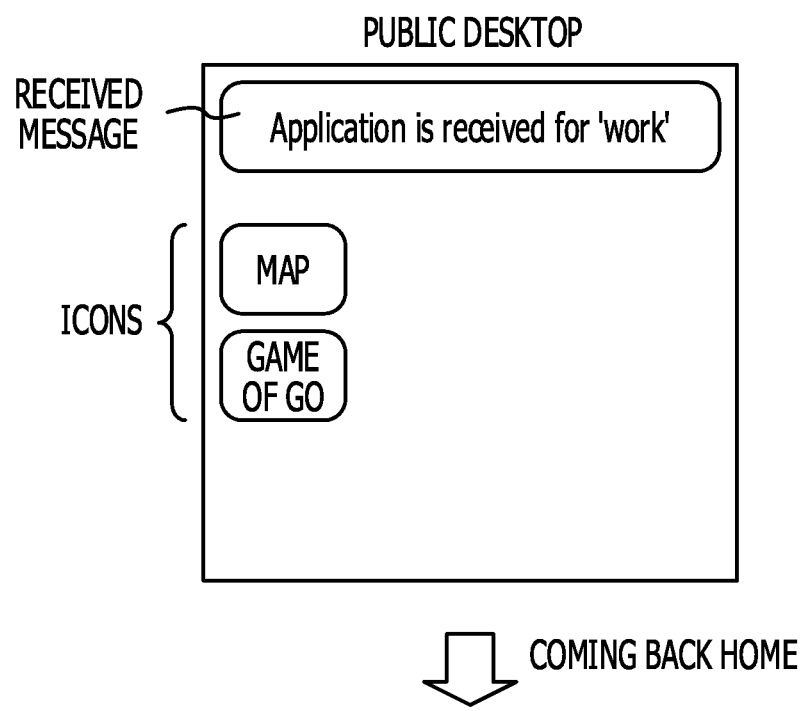
FIGS. 17A and 17B illustrate switching of the desktop of the mobile terminal device according to the fourth exemplary embodiment.
Figure 17B:
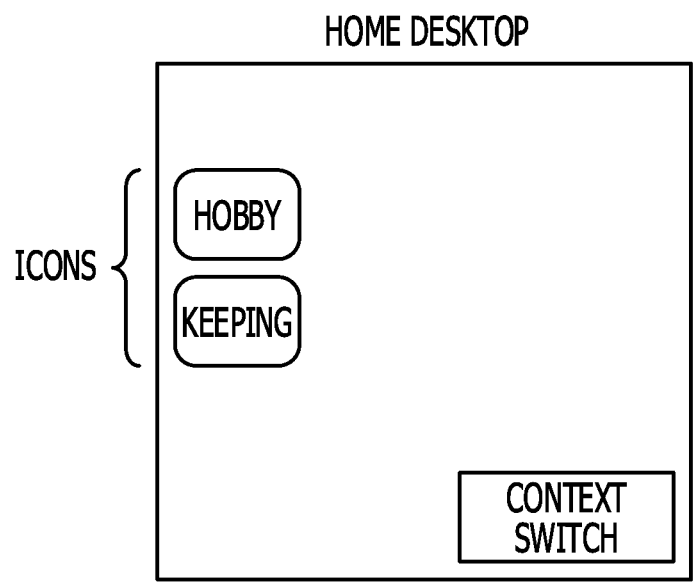

For example, when the user is traveling on a train and if an application having an attribute of "work" is automatically downloaded, the notifying unit 128C displays the received message "Application is received for 'work'", as illustrated in FIG. 17A. However, while the context of the mobile terminal device 100C is being "public" that sets "interruption" to "NO", the notifying unit 128C does not display the context switch. If the context of the mobile terminal device 100C is changed to "home" that sets "interruption" to "YES", the notifying unit 128C displays the context switch, as illustrated in FIG. 17B.

According to the present exemplary embodiment, even when the context switch is not displayed due to the context of the mobile terminal device 100C, the context switch is automatically displayed on the desktop if the context of the mobile terminal device 100C is changed to an appropriate context with, for example, a change in the location of the mobile terminal device 100C. As a result, the user of the mobile terminal device 100C can recognize the service request received from the PC 400 at the earliest possible time without any security problem.

Fifth Exemplary Embodiment

A mobile terminal device 100D according to a fifth exemplary embodiment is described below with reference to FIG. 18. Note that descriptions of the configurations and operations that are similar to those of the third exemplary embodiment are not repeated.

Figure 18:
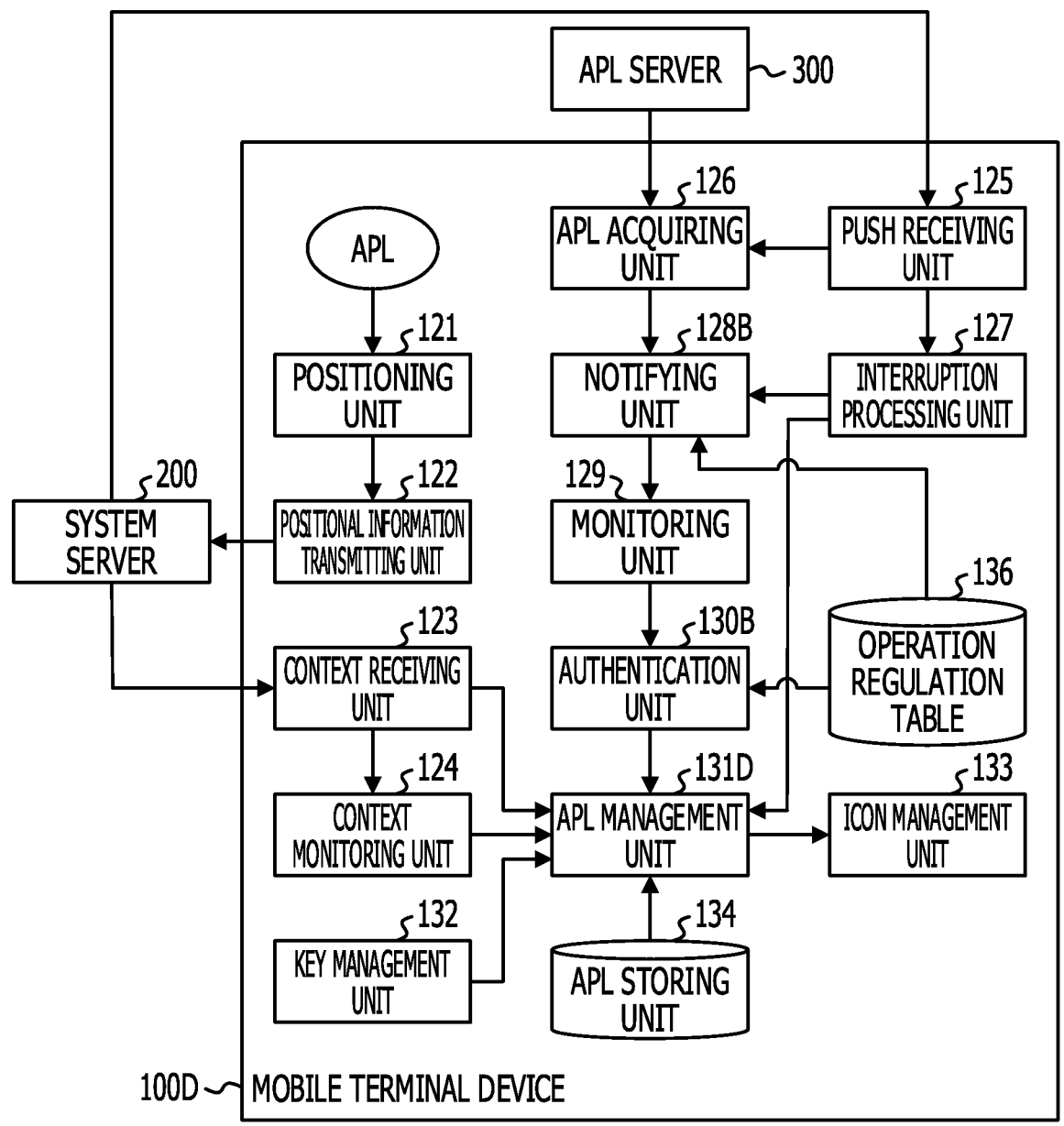
FIG. 18 is a functional block diagram of a mobile terminal device according to a fifth exemplary embodiment.

FIG. 18 is a functional block diagram of the mobile terminal device 100D according to the fifth exemplary embodiment.

As illustrated in FIG. 18, according to the present exemplary embodiment, the mobile terminal device 100D includes an APL management unit 131D that differs from the APL management unit 131 of the third exemplary embodiment. The APL management unit 131D is realized by the CPU 101 loading a control program 1200D into the main memory 102 and executing the control program 1200D loaded into the main memory 102.

When the context of the mobile terminal device 100D is changed to the context that sets "interruption" in the operation regulation table 136 to "NO" during execution of an application, the APL management unit 131D forcibly closes the application currently being executed.

According to the present exemplary embodiment, when an application is executed under a context that inhibits "interruption", the application is forcibly closed regardless of the type of service request. Accordingly, for example, a business application, such as an approval application, is not continuously executed under a context having a risk of information being peeked at. As a result, a risk of information leakage can be further reduced.

Sixth Exemplary Embodiment

A mobile terminal device 100E according to a sixth exemplary embodiment is described below with reference to FIG. 19. Note that descriptions of the configurations and operations that are similar to those of the fifth exemplary embodiment are not repeated.

Figure 19:
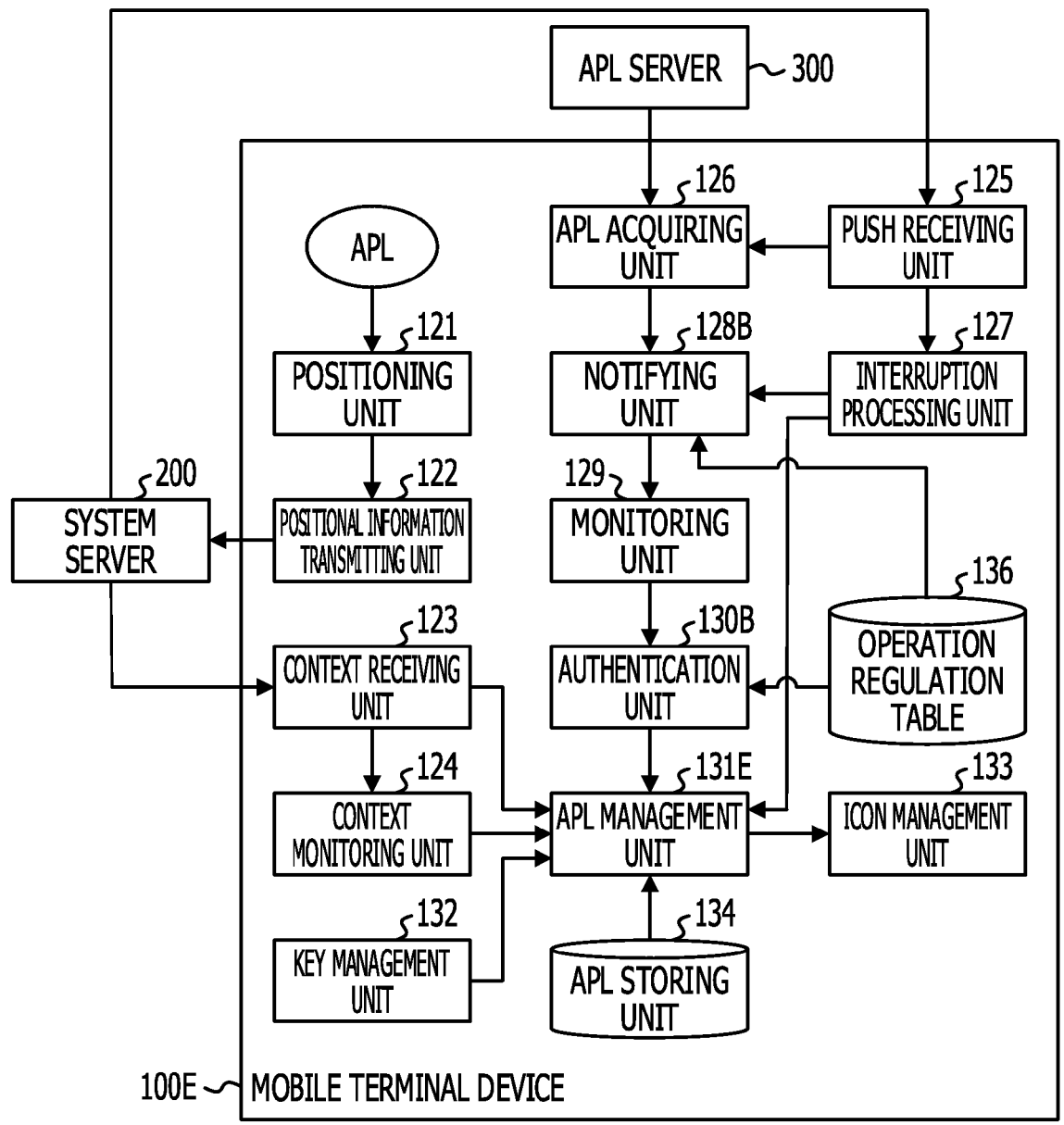
FIG. 19 is a functional block diagram of a mobile terminal device according to a sixth exemplary embodiment.

FIG. 19 is a functional block diagram of the mobile terminal device 100E according to the sixth exemplary embodiment.

As illustrated in FIG. 19, according to the present exemplary embodiment, the mobile terminal device 100E includes an APL management unit 131E that differs from the APL management unit 131D of the fifth exemplary embodiment. The APL management unit 131E is realized by the CPU 101 loading a control program 1200E into the main memory 102 and executing the control program 1200E loaded into the main memory 102.

When the context of the mobile terminal device 100E is changed to the context that sets "interruption" in the operation regulation table 136 to "NO" during execution of an application, the APL management unit 131E determines whether the elapsed time from when the context is changed exceeds a predetermined threshold value. If it is determined that the elapsed time from when the context is changed exceeds the predetermined threshold value, the APL management unit 131E forcibly closes the application currently being executed.

According to the present exemplary embodiment, even when, due to, for example, a change in the location of the mobile terminal device 100E, the context of the mobile terminal device 100E is made into a context that does not match the attribute of the application currently being executed, the application is allowed to continue execution for a predetermined period of time.

Accordingly, the execution of the application does not stop immediately after the context of the mobile terminal device 100E is changed. As a result, a decrease in the work efficiency for, for example, the service request received from the PC 400 can be minimized.

Furthermore, if the elapsed time from when the context is changed exceeds the predetermined threshold value, the application currently being executed is forcibly closed. Accordingly, a business application, such as an approval APL, does not continue execution under a context having a risk of others sneaking a peek at the screen. As a result, the risk of information leakage is not increased.

Seventh Exemplary Embodiment

A mobile terminal device 100F according to a seventh exemplary embodiment is described below with reference to FIGS. 20 and 21. Note that descriptions of the configurations and operations that are similar to those of the first exemplary embodiment are not repeated.

Figure 20:
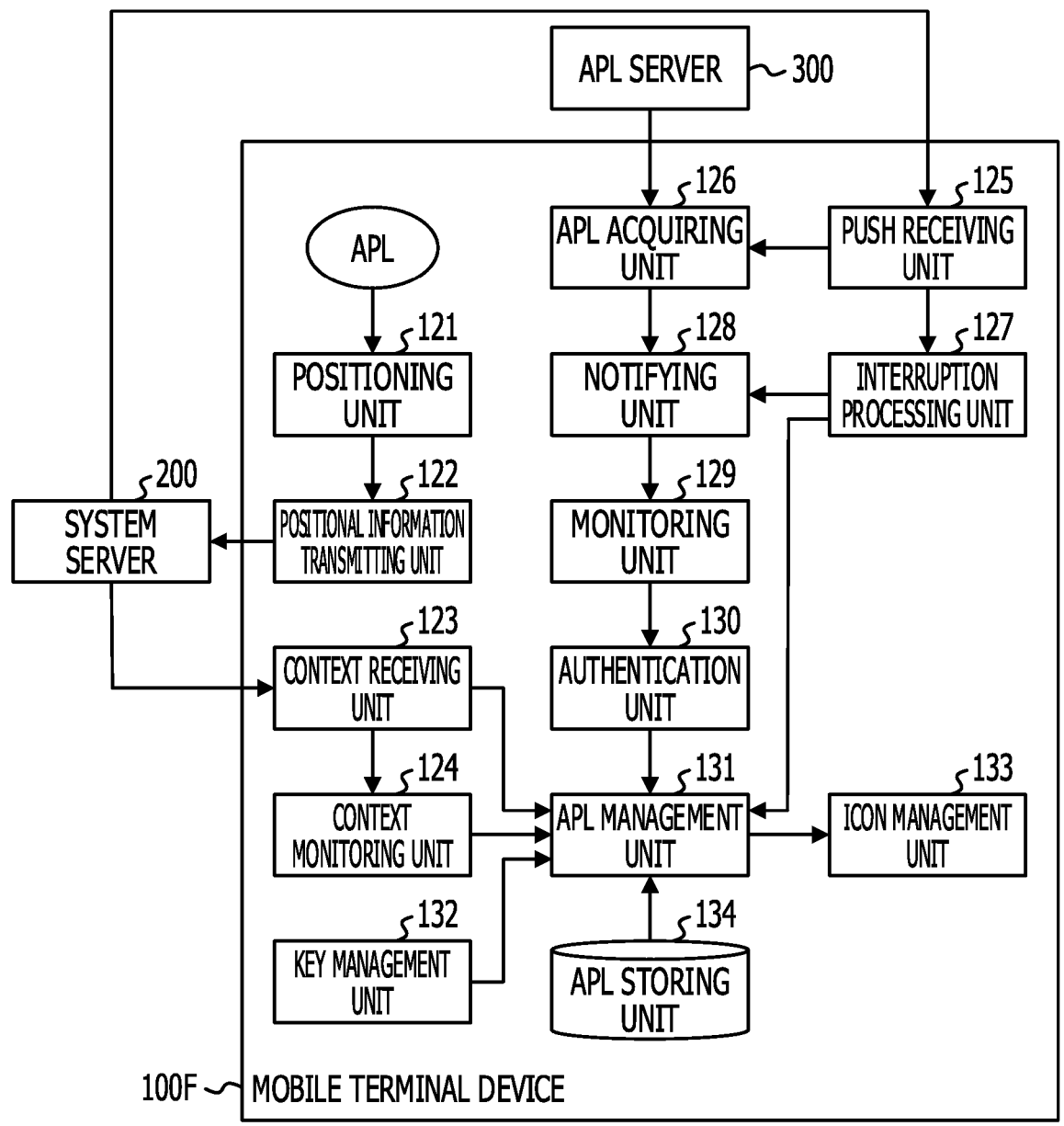
FIG. 20 is a functional block diagram of a mobile terminal device according to a seventh exemplary embodiment.
Figure 21A:
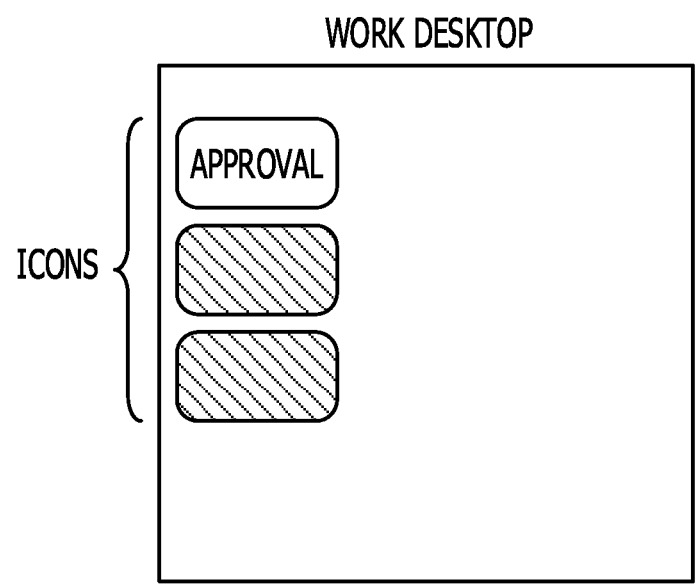
FIGS. 21A and 21B are schematic illustrations of the desktop of the mobile terminal device according to the seventh exemplary embodiment.
Figure 21B:
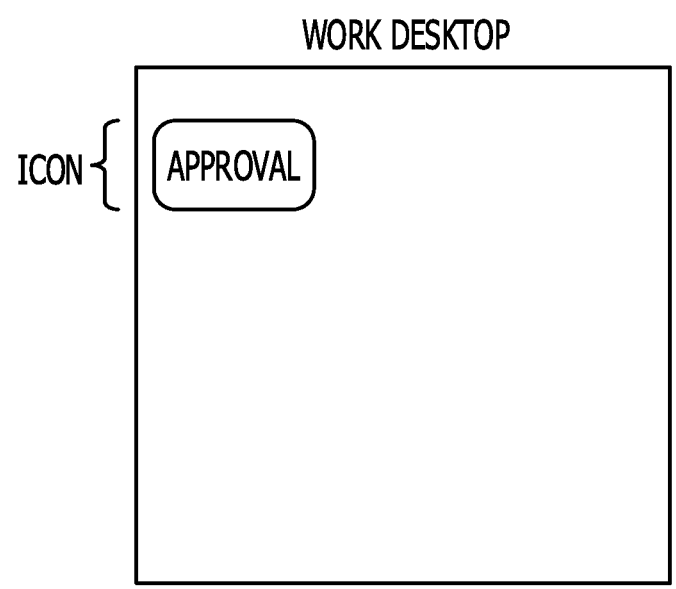

FIG. 20 is a functional block diagram of the mobile terminal device 100F according to the seventh exemplary embodiment. FIGS. 21A and 21B are schematic illustrations of the desktop of the mobile terminal device 100F according to the seventh exemplary embodiment.

As illustrated in FIG. 20, according to the present exemplary embodiment, the mobile terminal device 100F includes an icon management unit 133F that differs from the icon management unit 133 of the first exemplary embodiment. The icon management unit 133F is realized by the CPU 101 loading a control program 1200F into the main memory 102 and executing the control program 1200F loaded into the main memory 102.

When, due to receipt of an interrupting service from the PC 400, the icon management unit 133F replaces the icons of applications displayed on the desktop of the mobile terminal device 100F with the icons of applications related to the execution instruction (the interruption trigger instruction) received from the authentication unit 130, the displayed icons other than the icons related to the execution instruction are grayed out.

For example, if the application related to the execution instruction received from the authentication unit 130 is an approval APL, the icon management unit 133F normally displays only the icon of the approval APL. The other icons of a contract APL and a work schedule APL are grayed out, as illustrated in FIG. 21A.

Note that instead of graying out the icon of an application, the icon may be displayed in color that differs from the color of the other icons. Alternatively, the icon may be displayed in different form. For example, a cross mark overlapping the icon may be displayed.

Note that the present exemplary embodiment is not limited to the configuration described above. For example, the icon management unit 133F may delete the icons of applications other than the icon of the application related to the execution instruction (the interruption trigger instruction) received from the authentication unit 130.

For example, as illustrated in FIG. 21B, if the application related to the execution instruction (the interruption trigger instruction) received from the authentication unit 130 is an approval APL, the icon management unit 133F displays only the icon of the approval APL and does not display the icons of the contract APL and a work schedule APL.

According to the present exemplary embodiment, if, due to receipt of an interrupting service from the PC 400, the icon of an application having an attribute that does not match the context of the mobile terminal device 100F is displayed on the desktop of the mobile terminal device 100F, only the icon of an application related to the execution instruction (the interruption trigger instruction) received from the authentication unit 130 is normally displayed. Thus, the user can easily recognize the icon of the application related to the interrupting service.

Eighth Exemplary Embodiment

A mobile terminal device 100G according to an eighth exemplary embodiment is described below with reference to FIG. 22 and FIGS. 23A to 23C. Note that descriptions of the configurations and operations that are similar to those of the first exemplary embodiment are not repeated.

Figure 22:
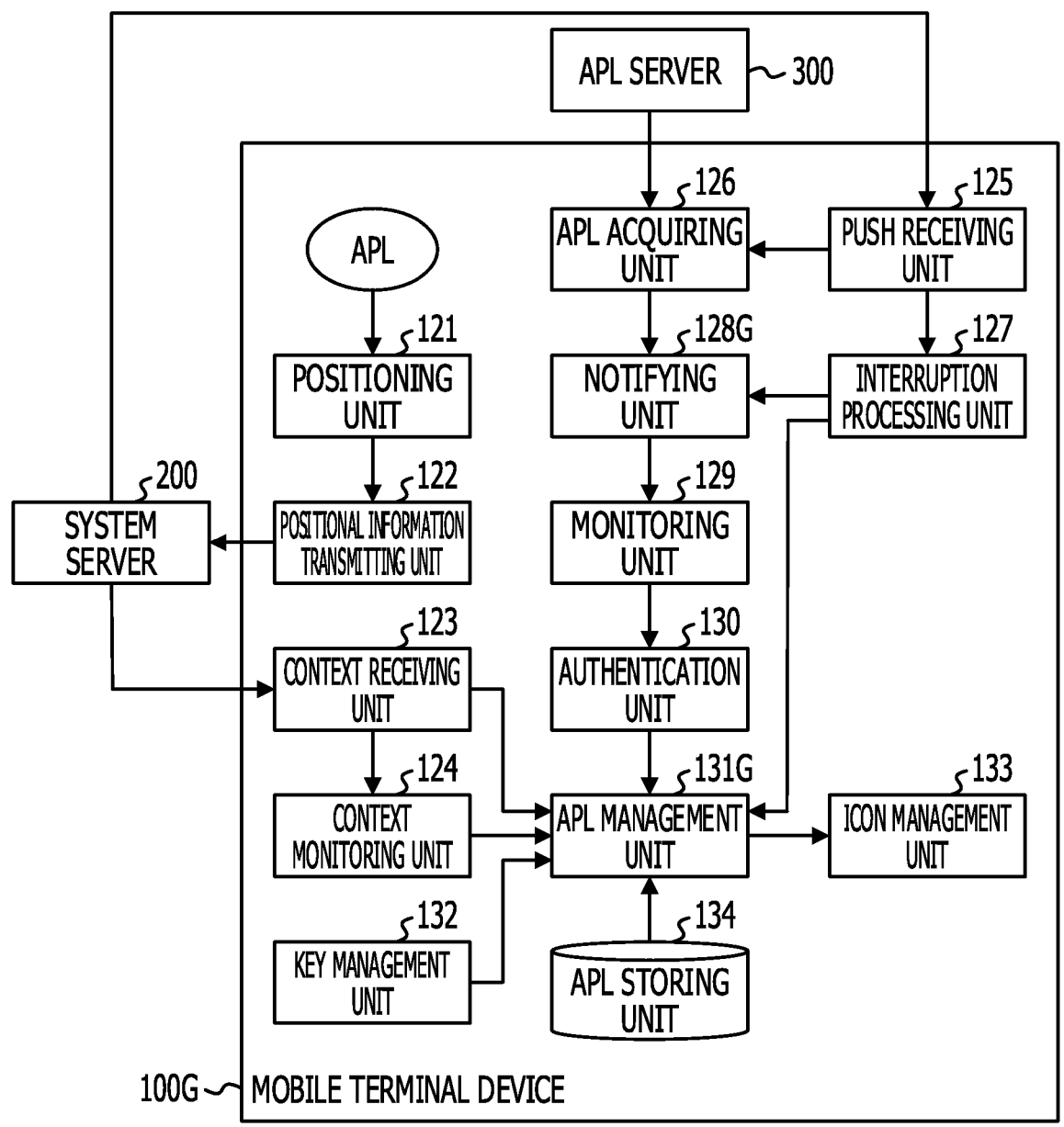
FIG. 22 is a functional block diagram of a mobile terminal device according to an eighth exemplary embodiment.
Figure 23A:
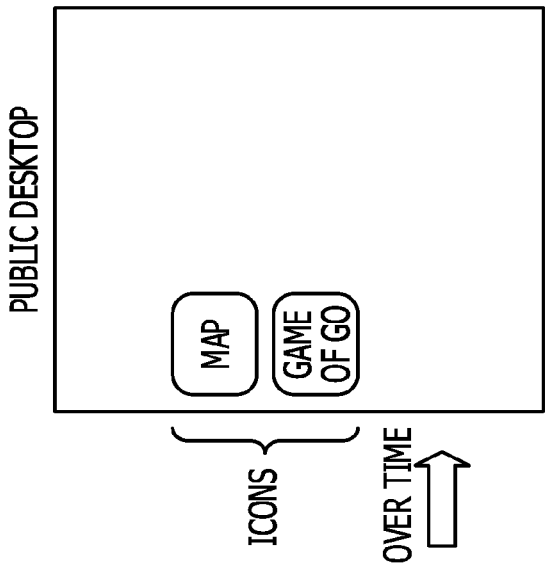
FIGS. 23A to 23C are schematic illustrations of switching of the desktop of the mobile terminal device according to the eighth exemplary embodiment.
Figure 23B:
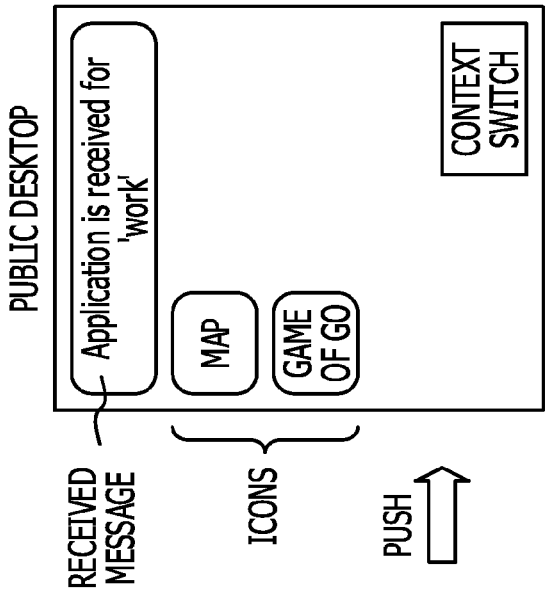
Figure 23C:
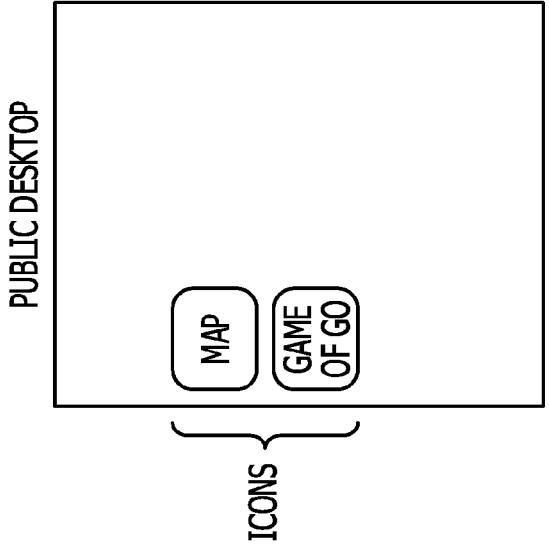

FIG. 22 is a functional block diagram of the mobile terminal device 100G according to the eighth exemplary embodiment. FIGS. 23A to 23C are schematic illustrations of switching of the desktop of the mobile terminal device 100G according to the eighth exemplary embodiment.

As illustrated in FIG. 22, according to the present exemplary embodiment, the mobile terminal device 100G includes a notifying unit 128G and an APL management unit 131G that differ from the notifying unit 128 and the APL management unit 131 of the first exemplary embodiment. The notifying unit 128G and the APL management unit 131G are realized by the CPU 101 loading a control program 1200G into the main memory 102 and executing the control program 1200G loaded into the main memory 102.

The notifying unit 128G deletes the context switch and the received message displayed on the desktop of the mobile terminal device 100G on the basis of the lifetime of the application downloaded from the APL server 300. The information indicating the lifetime of an application is attached to the application by the system server 200.

More specifically, the notifying unit 128G compares one of an elapsed time from when download of the application ends, an elapsed time from when the push message is received, and an elapsed time from one of the times using these times as a reference with the lifetime of the application. If the elapsed times exceed the lifetime of the application, the notifying unit 128G deletes the context switch and the received message from the desktop.

For example, as illustrated in FIG. 23A, when the context of the mobile terminal device 100G is "public" and if an application having an attribute of "work" is downloaded, the context switch and the received message are displayed on the desktop of the mobile terminal device 100G first, as illustrated in FIG. 23B. However, if the lifetime of the application expires, the context switch and the received message are deleted, as illustrated in FIG. 23C.

When the context switch and the received message are deleted, the APL management unit 131G deletes the application from the mobile terminal device 100G.

According to the present exemplary embodiment, when an application downloaded from the APL server 300 has a lifetime as an expiration date and if the lifetime has elapsed, the context switch and the received message are deleted from the desktop of the mobile terminal device 100G. Accordingly, the desktop of the mobile terminal device 100G does not become messy, since information unnecessary for the user is deleted.

Furthermore, according to the present exemplary embodiment, when the context switch and the received message are deleted, the application itself is deleted from the mobile terminal device 100G. Accordingly, an application unnecessary for the user does not remain in the mobile terminal device 100G.

While the present exemplary embodiment has been described with reference to the lifetime information attached to an application by the system server 200, the present exemplary embodiment is not limited thereto. For example, the system server 200 may attach the lifetime information to the push message.

Ninth Exemplary Embodiment

A mobile terminal device 100H according to a ninth exemplary embodiment is described below with reference to FIGS. 24 and 25. Note that descriptions of the configurations and operations that are similar to those of the first exemplary embodiment are not repeated.

Figure 24:
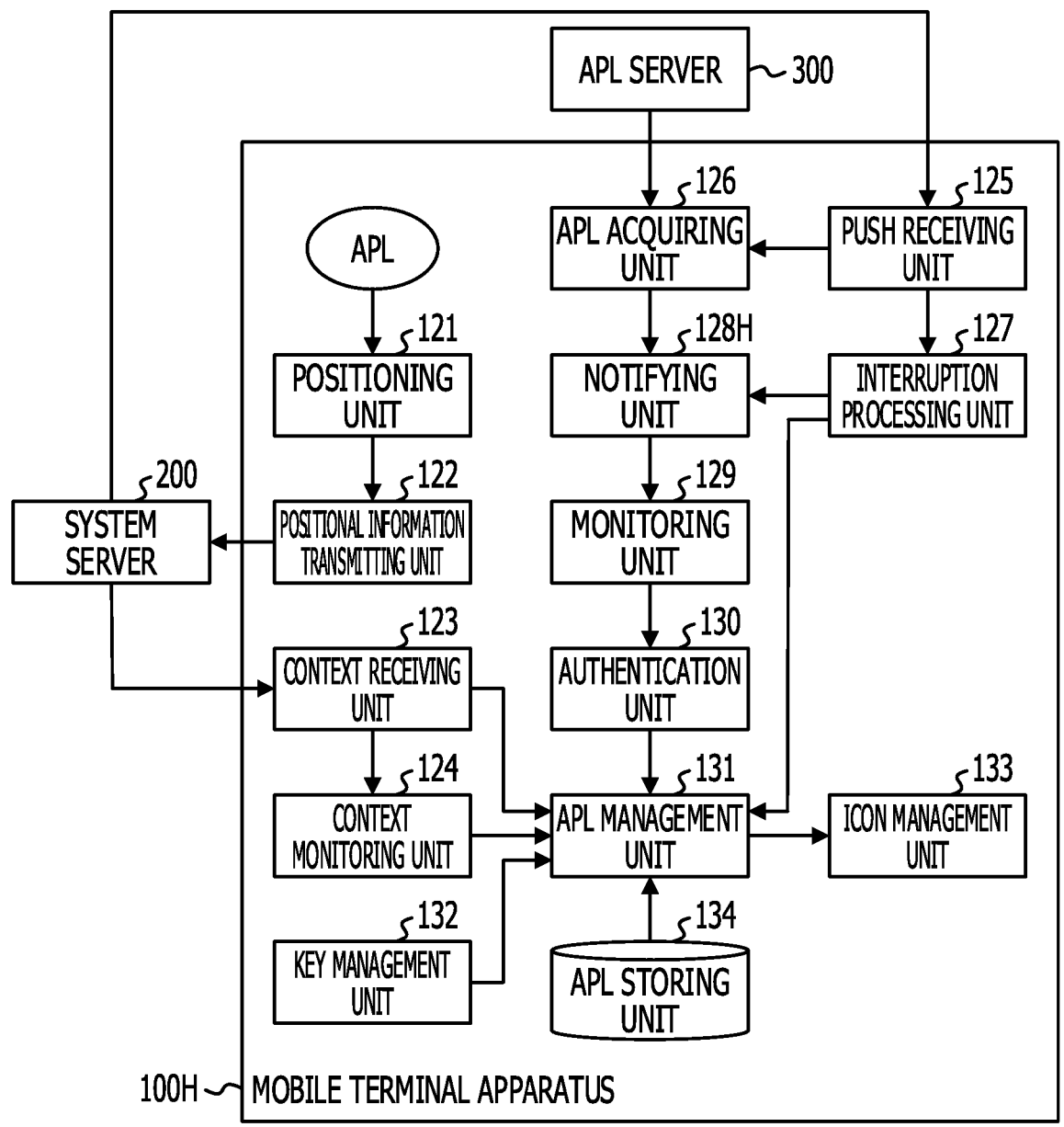
FIG. 24 is a functional block diagram of a mobile terminal device according to a ninth exemplary embodiment.

FIG. 24 is a functional block diagram of the mobile terminal device 100H according to the ninth exemplary embodiment. FIG. 25 is a schematic illustration of the desktop of the mobile terminal device 100H according to the ninth exemplary embodiment.

As illustrated in FIG. 24, according to the ninth exemplary embodiment, the mobile terminal device 100H includes a notifying unit 128H that differs from the notifying unit 128 of the first exemplary embodiment. The notifying unit 128H is realized by the CPU 101 loading a control program 1200H into the main memory 102 and executing the control program 1200H loaded into the main memory 102.

The notifying unit 128H displays a received message displaying, for example, the name and the attribute of the application on the basis of a push message received by the push receiving unit 125.

Figure 25:
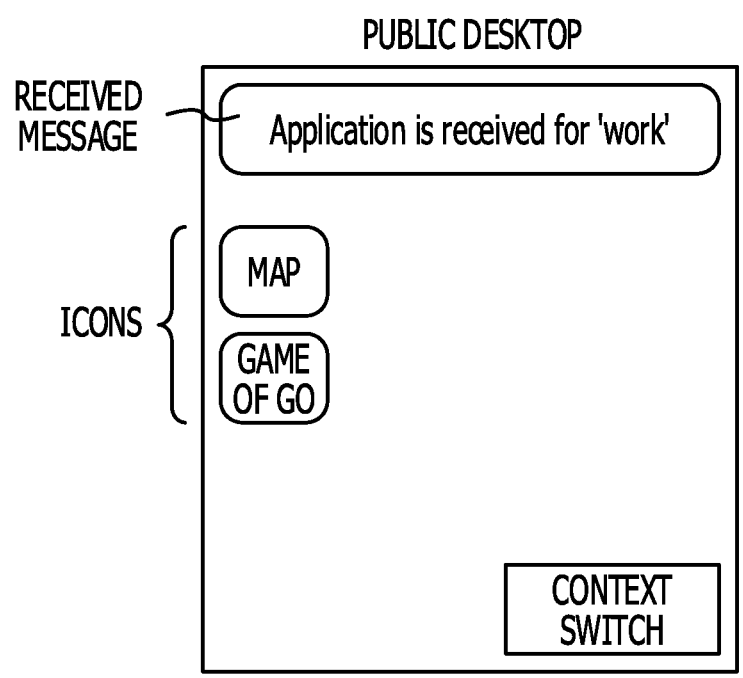
FIG. 25 is a schematic illustration of the desktop of the mobile terminal device according to the ninth exemplary embodiment.

For example, if the push message has an approval APL linked thereto, the received message "'Approval APL' is received for 'Work'" may be displayed on the desktop, as illustrated in FIG. 25.

According to the present exemplary embodiment, since a message displayed on the desktop displays, for example, the name and the attribute of the application, the user can recognize the type of the service request to be received from the PC 400 and the importance and urgency of the service request in advance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile terminal device coupled to a server via a network, the mobile terminal device comprising:
a processor configured to:
determine whether an attribute of an application matches a context specified by positional information regarding the mobile terminal device when receiving an execution instruction of the application from the server;
inform a user of information indicating that the execution instruction is received when the attribute does not match the context; and
execute the application based on a response to the information.

2. The mobile terminal device according to claim 1, wherein the processor is configured to display a message indicating that the execution instruction is received on the mobile terminal device.

3. The mobile terminal device according to claim 1, wherein the processor is configured to perform user authentication for determining whether the application is to be executed based on the response.

4. The mobile terminal device according to claim 3, wherein the processor is configured to perform the user authentication in accordance with the context.

5. A method for controlling a mobile terminal device coupled to a server via a network, the method comprising:
determining whether an attribute of an application matches a context specified by positional information regarding the mobile terminal device when receiving an execution instruction of the application from the server;

informing a user of information indicating that the execution instruction is received when the attribute does not match the context; and executing the application based on a response to the information.

6. A medium that stores a control program for causing a mobile terminal device coupled to a server via a network to execute a process comprising:

determining whether an attribute of an application matches a context specified by positional information regarding the mobile terminal device when receiving an execution instruction of the application from the server;

informing a user of information indicating that the execution instruction is received when the attribute does not match the context; and executing the application based on a response to the information.

\* \* \* \* \*